(12) United States Patent
Rode

(10) Patent No.: US 8,997,907 B2
(45) Date of Patent: Apr. 7, 2015

(54) VARIABLY OPENABLE RADIATOR COWLING, SHROUD, OR FAIRING FOR OVER THE ROAD VEHICLES AND THE LIKE

(71) Applicant: Mark Rode, Kirkwood, MO (US)

(72) Inventor: Mark Rode, Kirkwood, MO (US)

(73) Assignee: Aero18, LLC, Kirkwood, MO (US)

( * ) Notice: Subject to any disclaimer, the term of this patent is extended or adjusted under 35 U.S.C. 154(b) by 20 days.

(21) Appl. No.: 13/837,105

(22) Filed: Mar. 15, 2013

(65) Prior Publication Data

US 2013/0241231 A1    Sep. 19, 2013

Related U.S. Application Data

(63) Continuation-in-part of application No. 13/593,073, filed on Aug. 23, 2012.

(60) Provisional application No. 61/567,258, filed on Dec. 6, 2011.

(51) Int. Cl.
*B62D 35/00* (2006.01)
*F01P 11/10* (2006.01)
*B60K 11/08* (2006.01)

(52) U.S. Cl.
CPC .............. *B62D 35/001* (2013.01); *F01P 11/10* (2013.01); *B60K 11/085* (2013.01); *B60Y 2200/14* (2013.01); *B60Y 2200/145* (2013.01)

(58) Field of Classification Search
CPC ...... B60K 11/00; B60K 11/08; B60K 11/085; F01P 11/10; B62D 35/00; B62D 35/001; B62D 35/002
USPC .............. 296/180.2, 187.09, 201, 70, 193.02, 296/203.02, 180.3, 197.04, 192, 180.1; 180/68.1, 68.6; 160/120, 122, 368.1, 160/352, DIG. 1
See application file for complete search history.

(56) References Cited

U.S. PATENT DOCUMENTS

| | | | |
|---|---|---|---|
| 4,116,482 A | 9/1978 | Spiegel | |
| 4,610,326 A | 9/1986 | Kirchweger | |
| 4,658,925 A | 4/1987 | Hirosawa | |
| 4,850,444 A | 7/1989 | Bojanowski | |
| 4,915,441 A * | 4/1990 | Nitzke | 296/180.2 |

(Continued)

FOREIGN PATENT DOCUMENTS

FR    2738779 A1 *  3/1997
WO    91/01911 A1    2/1991

OTHER PUBLICATIONS

International Search Report for PCT application PCT/US2013/056103 mailed Nov. 22, 2013.

(Continued)

*Primary Examiner* — J. Allen Shriver, II
*Assistant Examiner* — Steve Clemmons
(74) *Attorney, Agent, or Firm* — CreatiVenture Law; Linda L. Lewis

(57) ABSTRACT

A cowling assembly (10) is installed about the radiator (R) of a vehicle (V). A frame (12) fits about the radiator and defines an opening through which air can flow into the radiator. A rack and pinion drive (600) for moving a sheet (618) over the frame to expose a portion of the opening and allow air to flow into the radiator, the frame and sheet producing a smoother flow of air over and about the front of the vehicle thereby reducing the amount of drag on the vehicle while still allowing air flow into the radiator.

16 Claims, 57 Drawing Sheets

(56) References Cited

U.S. PATENT DOCUMENTS

| | | |
|---|---|---|
| 5,275,249 A | 1/1994 | Nelson |
| 5,317,880 A | 6/1994 | Spears |
| 6,012,759 A | 1/2000 | Adamek |
| 6,230,832 B1 | 5/2001 | von Mayenburg |
| 6,390,217 B1 * | 5/2002 | O'Brien et al. ............... 180/68.6 |
| 6,848,524 B2 | 2/2005 | Vaillnancourt |
| 7,971,918 B2 | 7/2011 | Oriet |
| 8,002,335 B2 | 8/2011 | Usuda |
| 2004/0026953 A1 | 2/2004 | Neel |
| 2006/0060401 A1 | 3/2006 | Bole |
| 2011/0187153 A1 | 8/2011 | Boutaris et al. |

OTHER PUBLICATIONS

Written Opinion of the International Search Authority for PCT application PCT/US2013/056103 mailed Nov. 22, 2013.

* cited by examiner

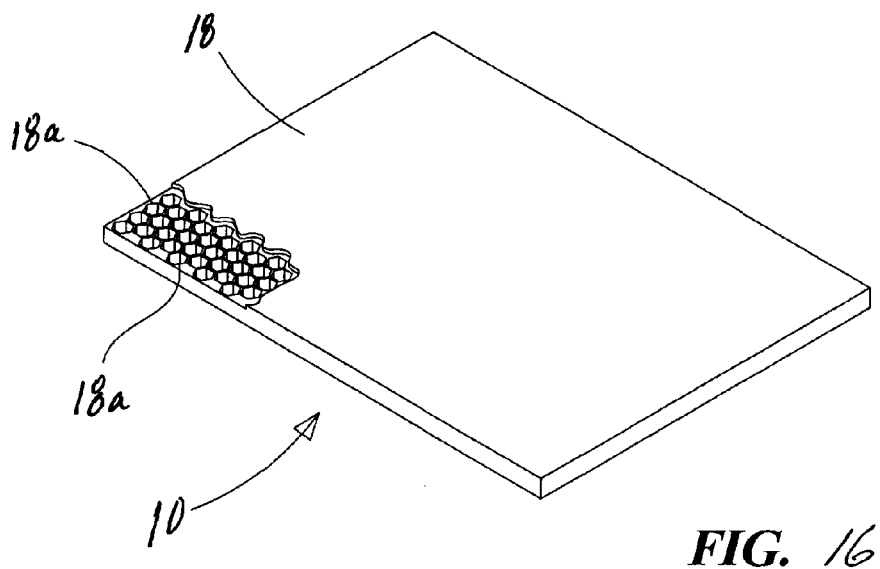
FIG. 16
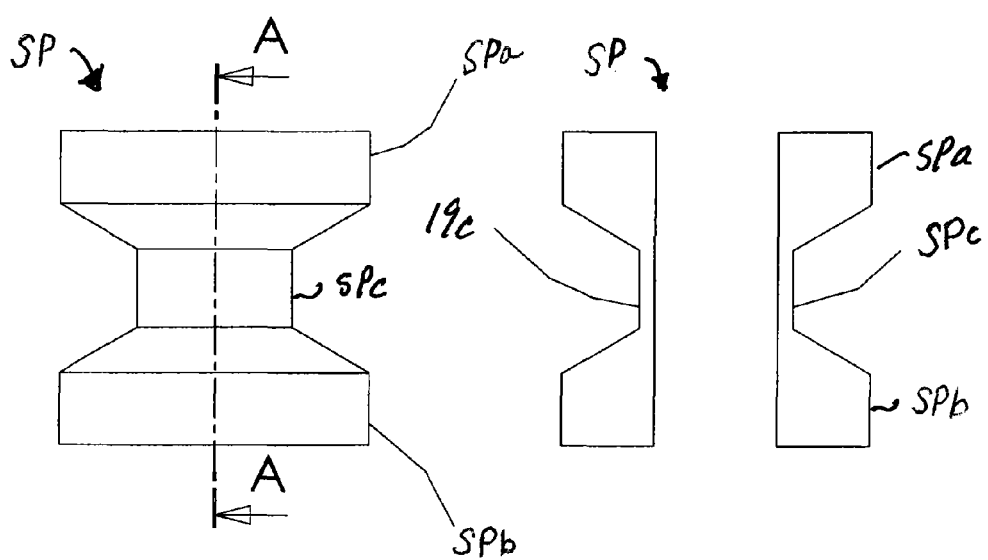
FIG. 19A   FIG. 19B

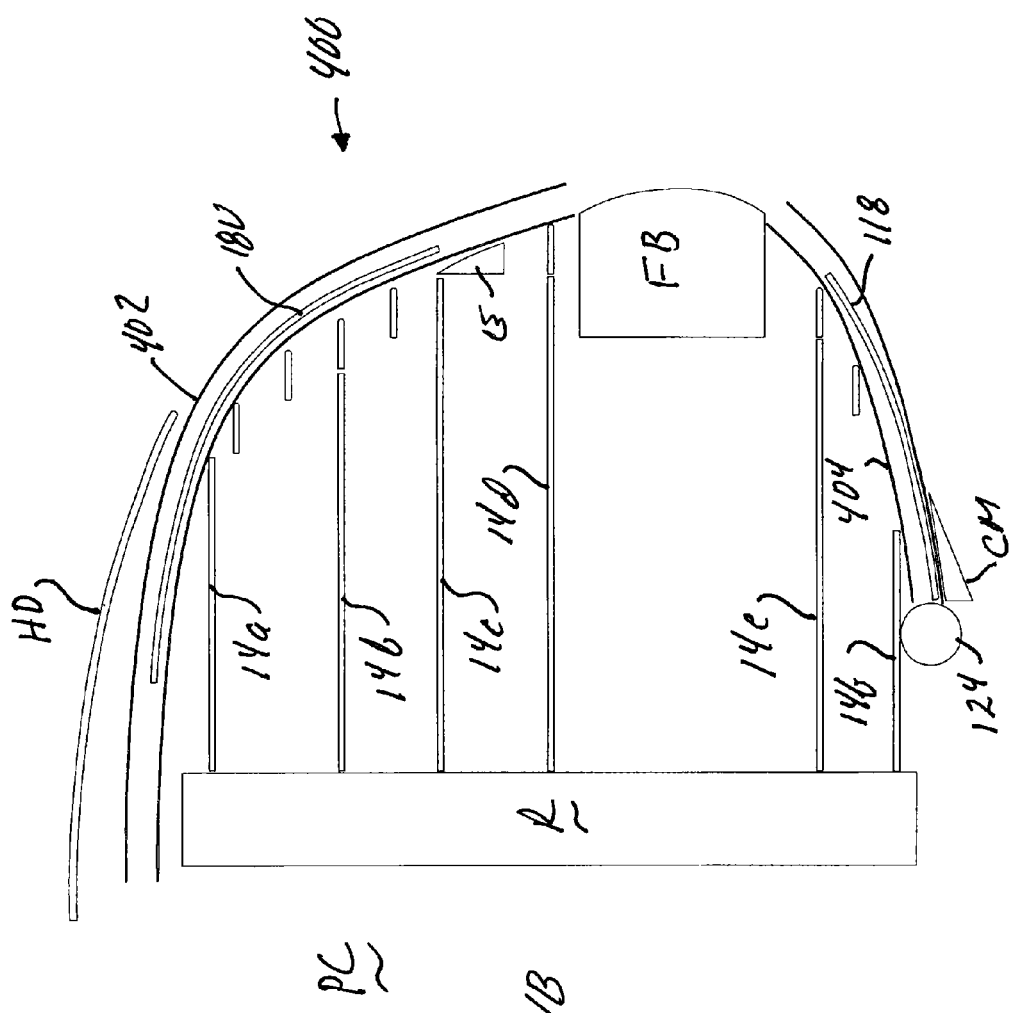

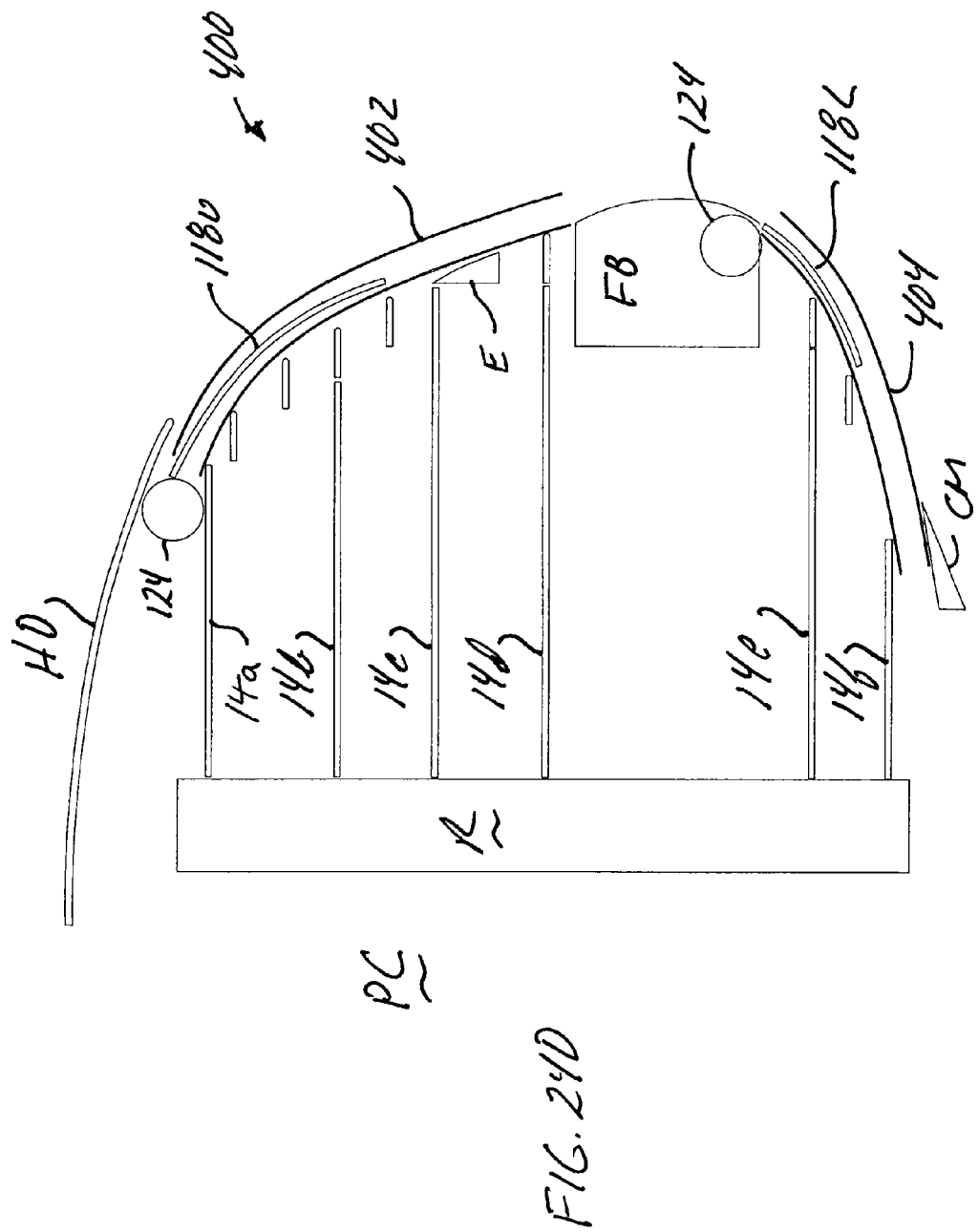

REAR VIEW OF 4-TRACK TRUCK COWLING

FIG. 31
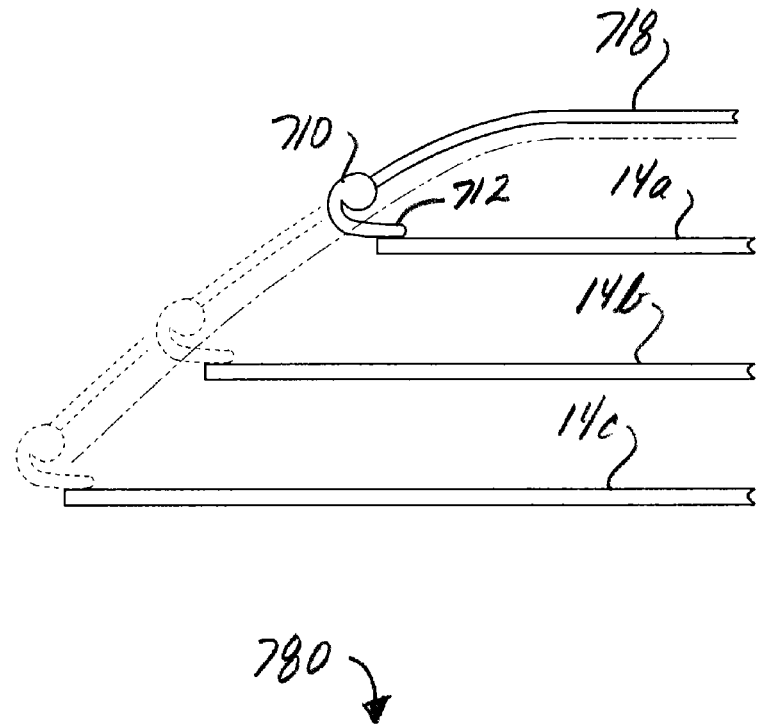
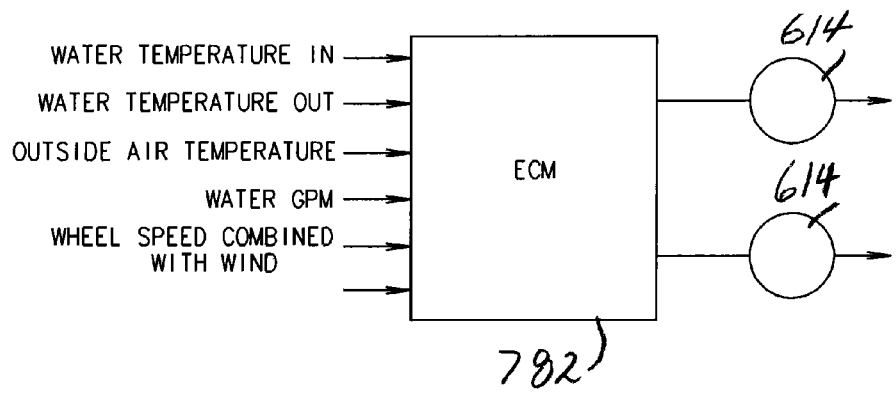
FIG. 32

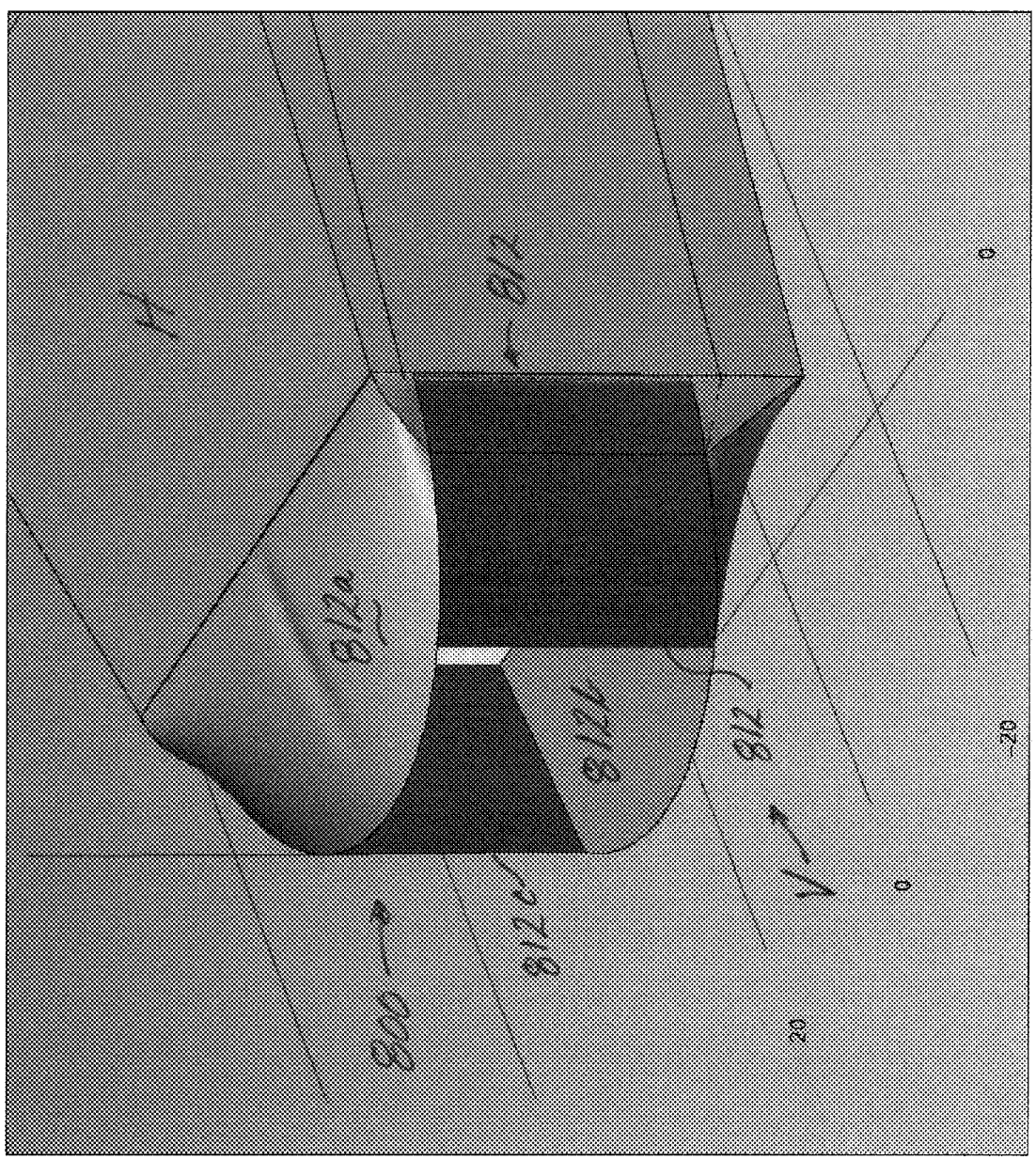

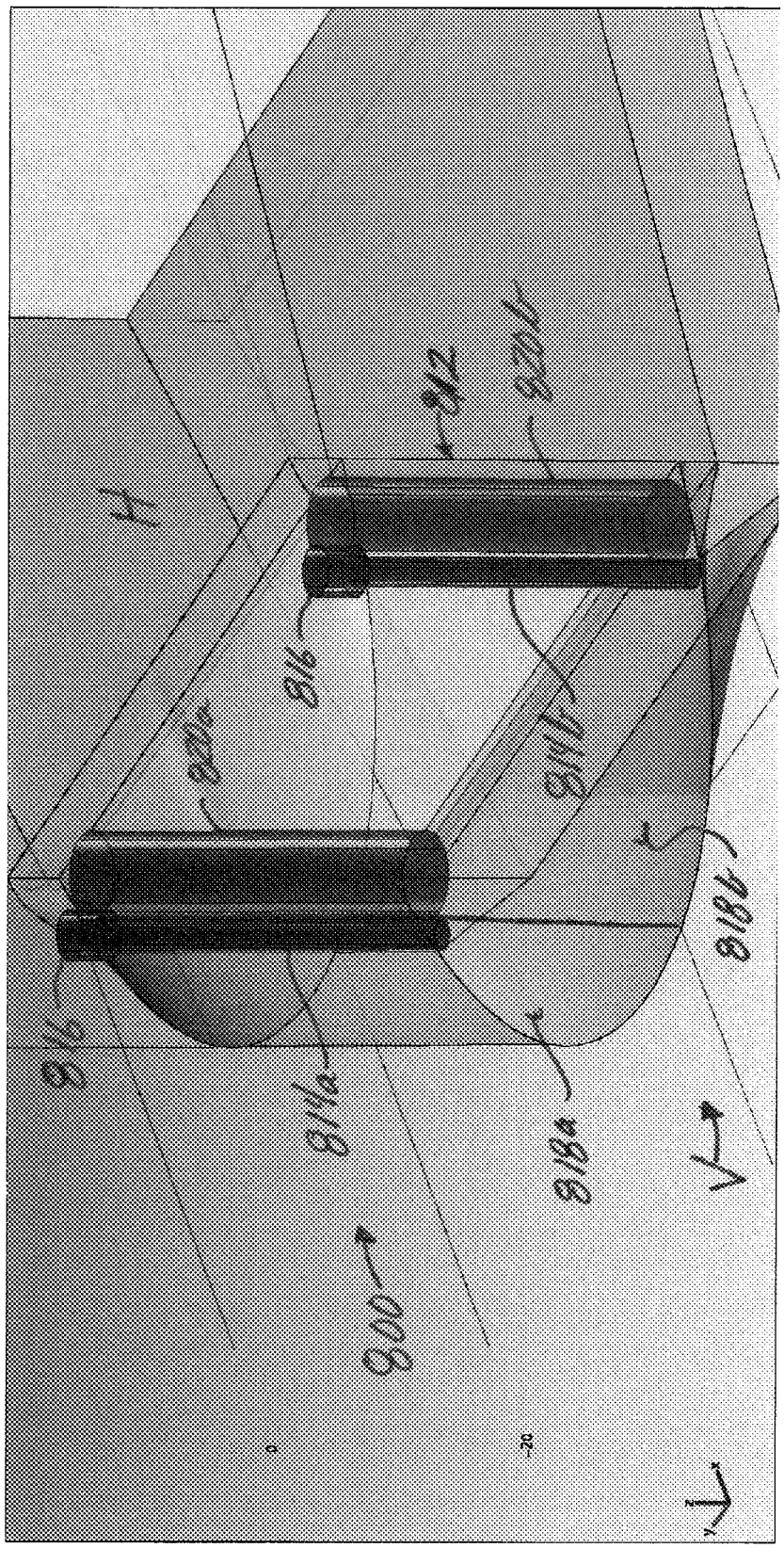

VARIABLY OPENABLE RADIATOR COWLING, SHROUD, OR FAIRING FOR OVER THE ROAD VEHICLES AND THE LIKE

CROSS REFERENCE TO RELATED APPLICATIONS

This application is a continuation-in-part of U.S. patent application Ser. No. 13/593,073 filed Aug. 23, 2012 which is based on provisional U.S. patent application 61/567,258 filed Dec. 6, 2011, which is herein incorporated by reference.

STATEMENT REGARDING FEDERALLY SPONSORED RESEARCH OR DEVELOPMENT

N/A

BACKGROUND OF THE INVENTION

This invention relates to reducing drag in over-the-road vehicles (including trucks and passenger car) to make them more fuel efficient; and, more particularly, to a cowling, shroud, or fairing (collectively, a cowling) which is installed over the radiator of the vehicle to improve the vehicle's aerodynamic characteristics.

It is well known that over the road trucks, semis and the like, have low fuel efficiency. Typically, these tractor trailer vehicles attain about five to seven miles per gallon (5-7 mpg) when traveling at highway speeds of, for example, 50-70 miles per hour (mph). One reason for this is the aerodynamic characteristics of these vehicles and their high coefficient of drag. A number of attempts have been made to improve the aerodynamics of these vehicles in order to improve gas mileage. Fairings with curved surfaces have been mounted on top the vehicle's cab to create a smoother air flow over the top of the vehicle. Other devices have also been installed on the vehicles for this purpose.

However, a major contributor to the vehicle's drag is the blunt front end of the truck where the radiator is located. The radiator, which is generally rectangular in shape, extends vertically from an area adjacent the truck's from bumper to the top of its hood. It also extends horizontally across a good portion of the front end of the track. As the truck moves over the road, air strikes the radiator and is forced either over or under the top and bottom of the radiator, and about it sides. This, in turn, creates a drag which significantly impacts the trucks forward movement and increases its fuel consumption.

With regard to the above described problem, it is known to use spoilers or air dams to help reduce drag. However, these are typically static devices which provide a limited amount of help in reducing drag. Further, these devices are specific to the particular vehicle on which they are installed. It would be valuable and advantageous to have a structure (cowling, fairing, shroud, air dam or the like) as either original equipment (OE) or as a retrofit which is adjustable so to reduce the drag encountered in a variety of situations and in which, even if only one particular design is usable on a particular vehicle, its operation can be adjusted to accommodate any differences between vehicles of the same type.

While passenger cars and similar vehicles do not create the same amount of drag as trucks when they travel at highway speeds, use of a cowling of the present invention on them will also improve their fuel efficiency.

BRIEF SUMMARY OF THE INVENTION

The present invention is directed to a cowling which is installed over a truck's radiator either as original equipment, or as a retrofit. The cowling, when installed, has a curved outer surface which promotes aerodynamic airflow over, under, and about the sides of the cowling so to significantly reduce drag and improve fuel efficiency.

The cowling includes a frame installed about the sides of the radiator. Sheets, coils, or panels, or a combination of these elements and their associated structure, are either mounted in the frame, or are incorporated in the grill or hood of the vehicle. Regardless of which construction is used, the resulting size and shape produces an aerodynamic configuration which reduces drag and promotes improved vehicle fuel economy. Electric motors such as stepper or gear motors, with or without clutches, are used to move the various components either vertically or horizontally with respect to the radiator, depending upon the radiator design, so to expose the radiator to air. This allows airflow through the radiator (and about the engine) so to draw heat away from it; while, at the same time, improving the drag characteristics of the vehicle and increasing its fuel efficiency.

The cowling further includes heat flow paths by which a heated fluid from the radiator flows through the cowling so to prevent it from freezing up during cold, sleet, ice and snow conditions. In other embodiments of the invention, a heating system is employed with the elements, or tracks in which they move, so to create sufficient heat to prevent freeze up of the system in icy or freezing conditions. Alternately, these components are coated with a thermal film for the same purpose.

Movement of the sheets, coils, or panels is controlled by a controller programmed for the vehicle on which the cowling is installed. The controller, which is either stand-alone or is incorporated into an electronic control module (ECM) of the vehicle, receives as inputs the outputs of sensors monitoring the temperature of the various engine fluids, radiator fluid temperature, the ambient temperature of outside air, and other parameters, so to control the opening and degree of opening of the sheets, coils, or panels. The ECM can further be used to regulate and control the flow of water through the radiator controlling, for example, an electric water pump.

The cowling assembly is relatively lightweight and the parts are made of a rugged, molded plastic material or a shaped metal. The cowling is easy to install, remove, and service. The cowling is relatively low cost and has a useful life of 6-9 years. When in use, the cowling restores a significant amount of horsepower otherwise wasted by vehicles as currently configured and realizes substantial (e.g., an estimated $3.0 B-4.0 B) annual fuel savings because of the reduction in drag affected by the cowling if, for example, the entire current fleet of trucks were outfitted.

Various embodiments of the invention, as noted, employ coiled sheets of material, panels, and combinations thereof. Also as noted, the sheets or panels, is oriented either to move across the front of the radiator from side-to-side, or up and down. In this latter embodiment, a coiled sheet is drawn down from above, or below, the hood of the vehicle; or, alternately, up from the vehicle's front bumper or air dam region. In still another embodiment, the track over which the panels or sheet moves is integrally formed with the hood of the vehicle. In a further embodiment, the panel or sheets slide under the front bumper of the vehicle; or, they duct up into the radiator assembly.

Alternately, the invention employs an adjustable structure for reducing the amount of air flowing underneath a vehicle so to reduce aerodynamic lift and drag. The structures installed on similar type vehicles are adjustable to take into account any differences between the vehicles.

Those skilled in the art will appreciate that variations of the cowling installed on passenger cars will achieve similar advantageous results for these vehicles.

Subsequent to the filing of U.S. patent application Ser. No. 13/593,073, the applicant has developed a series of improvements and refinements of the structures described and claimed therein. These further enhance the active grille shutter (AGS) technology previously developed to further improve air flow into vehicle radiators (trucks or passenger cars).

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 4B is a side view of the cowling assembly in its FIG. 4A position and FIG. 4C is a sectional view of the assembly in this position.

FIG. 16 is a perspective view, partly broken away of a panel used in the cowling assembly;

FIG. 19A is an elevation view of a shear pin used to interconnect the panels and FIG. 19B is a sectional view of the pin taken along line A-A in FIG. 19A;

FIGS. 24A-24E are sectional views of the front of a passenger vehicle illustrating installation of coiled sheets behind a front bumper of an automotive vehicle;

FIG. 31 is a side view of a sheet assembly including a scraper element attached to the front of the sheet;

FIG. 32 is a block diagram of an alternate control apparatus for moving a sheet back and forth over the grille;

Corresponding reference characters indicate corresponding parts throughout the several views of the drawings.

DETAILED DESCRIPTION OF INVENTION

Figure 1:
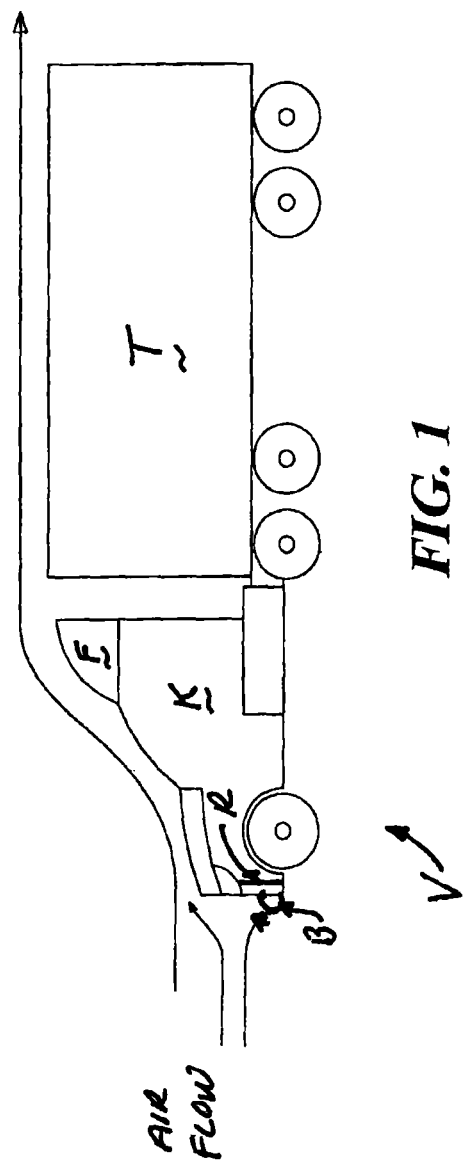
FIG. 1 is a simplified representation of an over-the-vehicle illustrating current structures used to improve the aerodynamics of the vehicle.

Referring to the drawings, an over-the-road vehicle V comprises a truck K towing a trailer T. As is known in the art, because of the size and shape of the truck and trailer, flow of air over and about the vehicle creates a drag which has to be overcome as the vehicle moves over a roadway; and this, in turn, reduces the vehicle's fuel efficiency. In an effort to reduce drag, a fairing such as the exemplary fairing F shown in FIG. 1 is installed atop the truck's cab. As previously discussed, a radiator R installed on the front of the truck, under its hood H and behind its front bumper B, creates significant drag, and heretofore, no significant attempts have been made to improve the aerodynamics of the airflow about the radiator. Radiator R typically presents a generally flat rectangular shaped surface against which the air buffets and creates the drag.

Figure 2A:
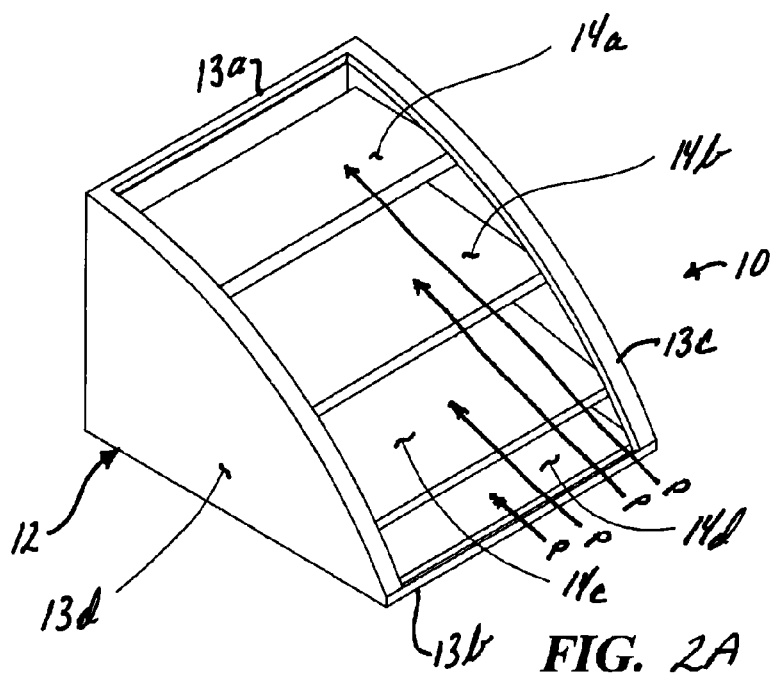
FIGS. 2A-2D are respective perspective, front, top, and side views of a first embodiment of the invention in which panels move vertically.
Figure 2D:
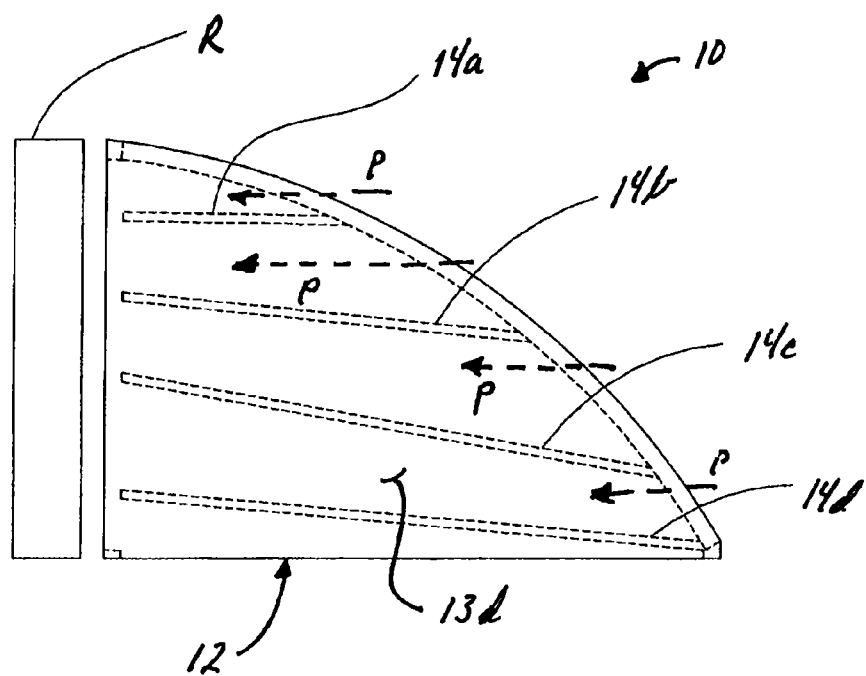
Figure 2B:
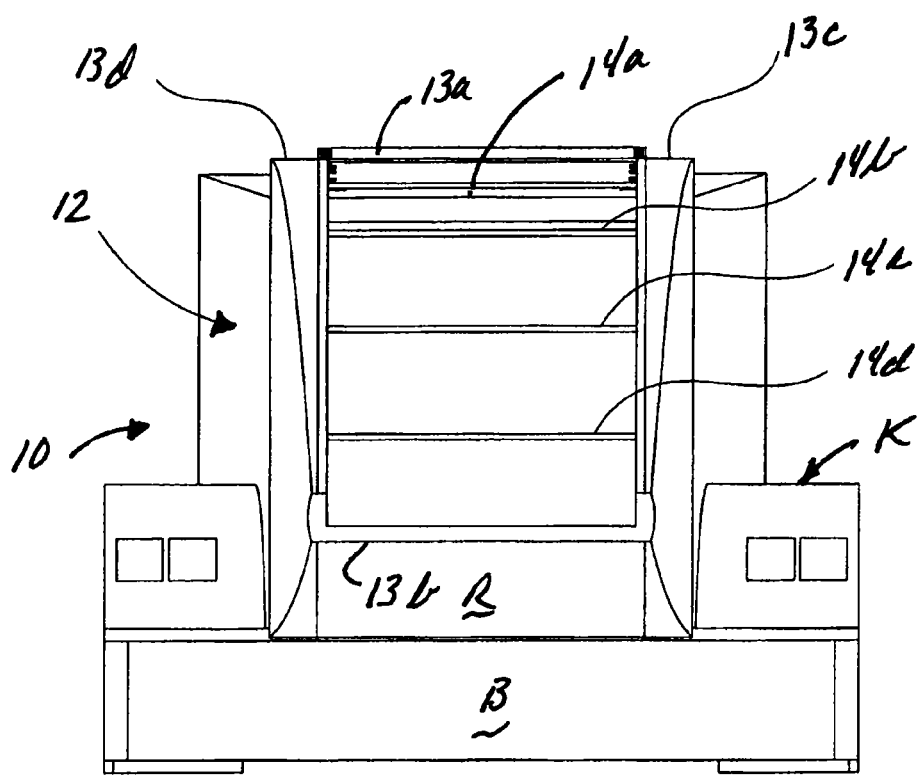
Figure 2C:
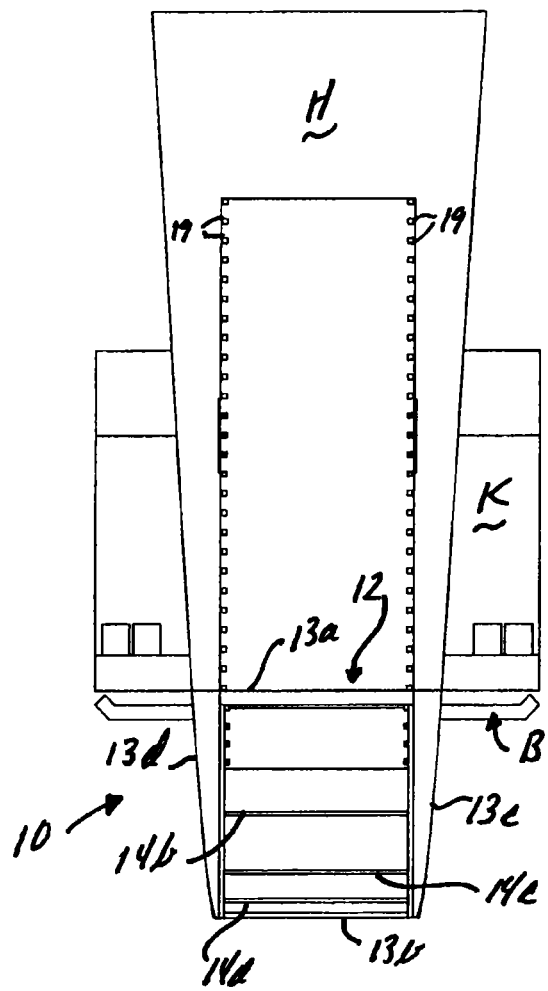

Referring to FIGS. 2A-2D, a cowling assembly 10 is for a radiator which is generally taller than it is wide. As described herein, cowling assembly 10 is integrally formed with a hood H of truck K, or the cowling is attached or retro-fitted to the hood. Cowling 10 first includes a frame 12 which fits about the top and sides of the radiator so to install the cowling in place. Frame 12 is preferably of a molded lightweight plastic, single piece construction; although, it can be made of a lightweight metal. As shown in FIG. 2A, the frame comprises upper and lower horizontal segments 13a and 13b, and vertical side sections or sidewalls 13c and 13d. When installed, frame 12 defines an opening through which air can flow into the radiator.

Mounted in frame 12 are a series of panels 14a-14d which are made of a plastic or lightweight metal. It will be understood that there could be more, or fewer, panels than are shown throughout the drawings. The panels are inserted in frame 12 through tracks (not shown) which are formed in the interior walls of frame sections 13c, 13d. The tracks may be heated tracks. The panels define air flow passages or air tunnels P for air directed through cowling assembly 10 to radiator R. Each panel is generally rectangular in shape and sufficiently sturdy that its shape is not distorted when the vehicle is moving at highway speeds; and, the sides or tips of the panels are sufficiently rigid that they do not bow or flex out of the tracks in which they are installed. Each panel may also have a rigid outer tip end (not shown) installed on it to prevent flexure. The panel could also potentially be forced into a distorted shape by the grille structure of the vehicle, or parts of the vehicle around the grille.

As shown in FIG. 2A, while each panel is of the same width, the depth of the panels varies. That is panel 14a is the narrowest in depth and panel 14d the greatest. Panels 14b and 14c have widths intermediate those of these other two panels.

Figure 3A:
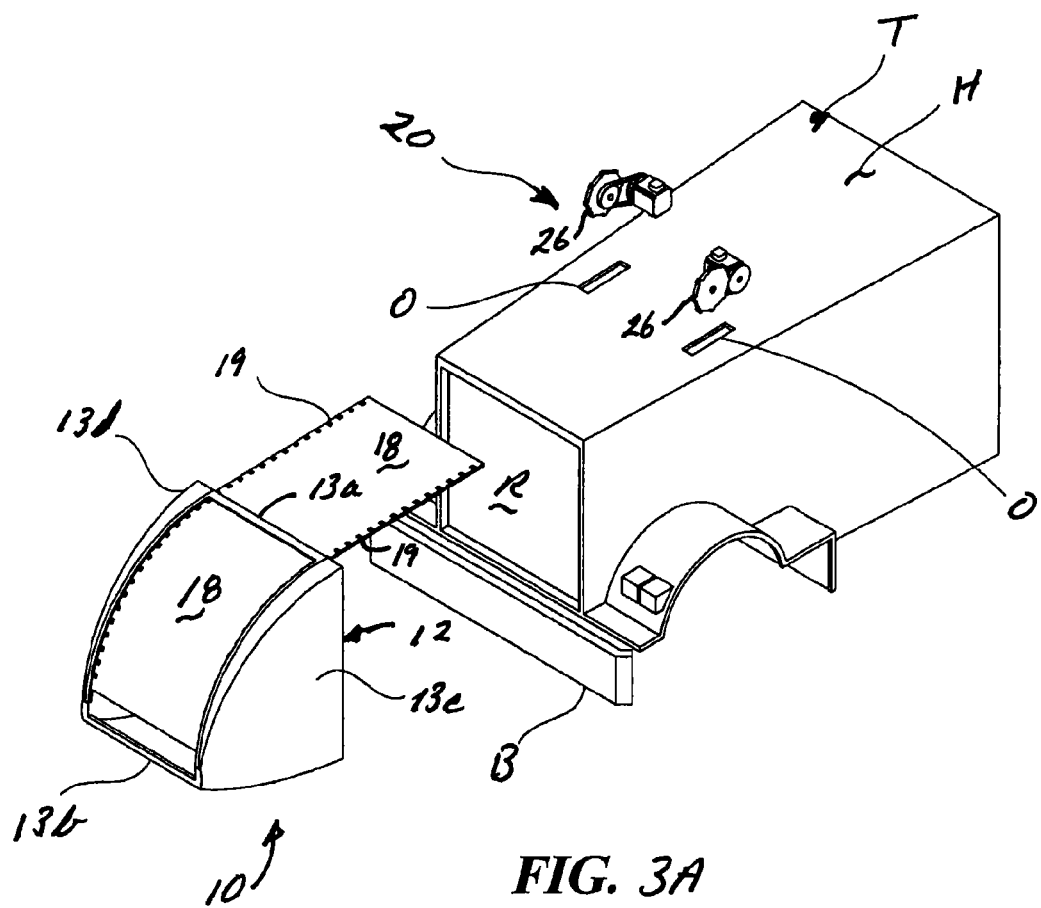
FIG. 3A is an exploded view illustrating one embodiment of a cowling assembly of the present invention for installation with the hood of a truck.
Figure 3B:
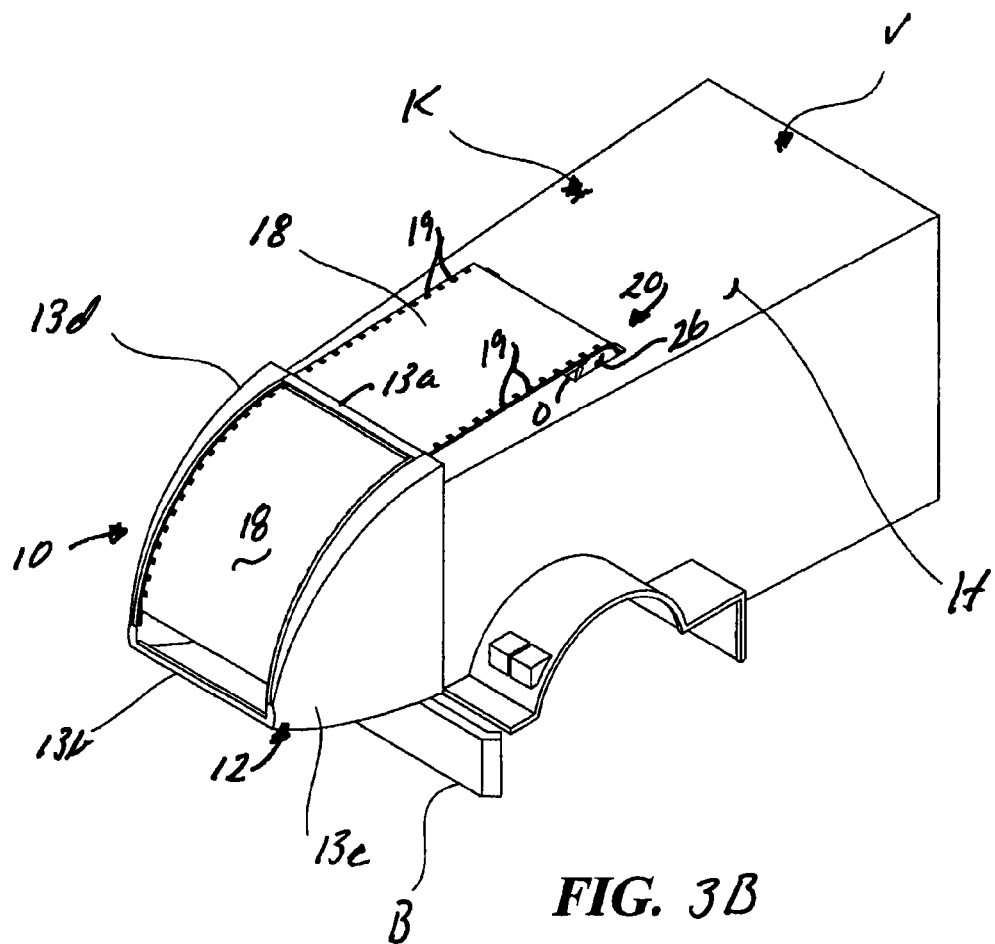
FIG. 3B is an installed view of the cowling assembly of FIG. 3A in a partially open position.
Figure 3C:
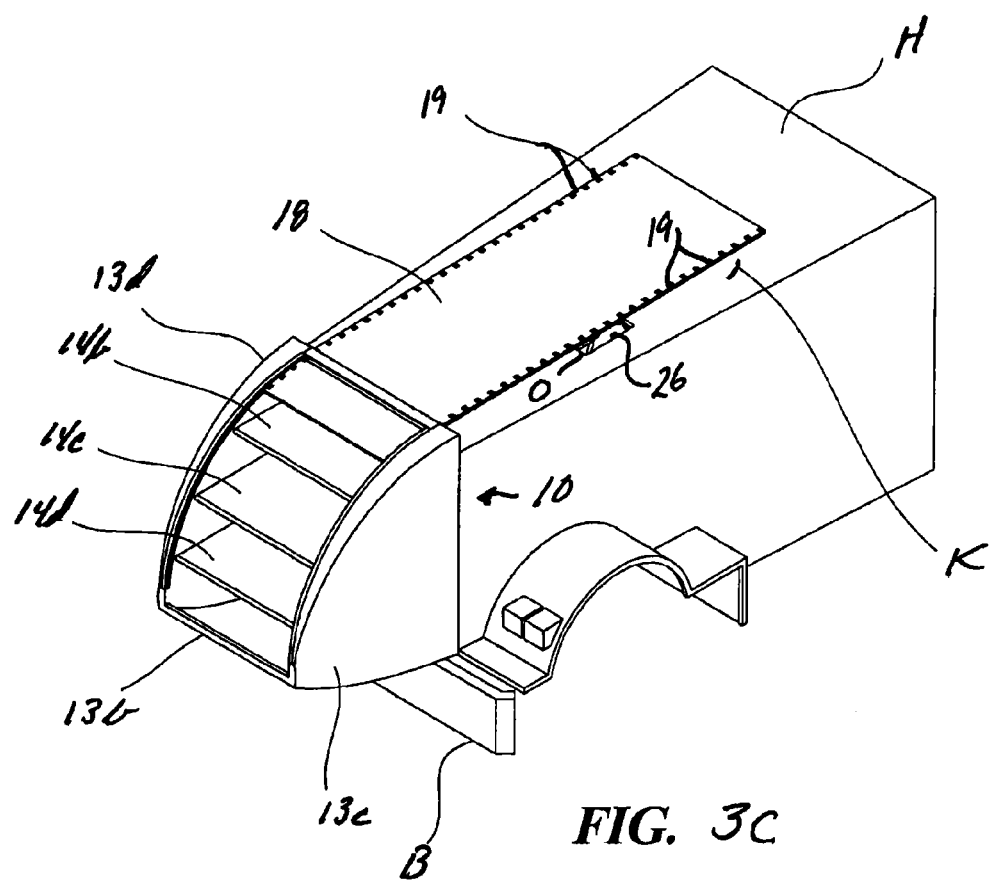
FIG. 3C illustrates a fully open position of the cowling assembly.
Figure 48:
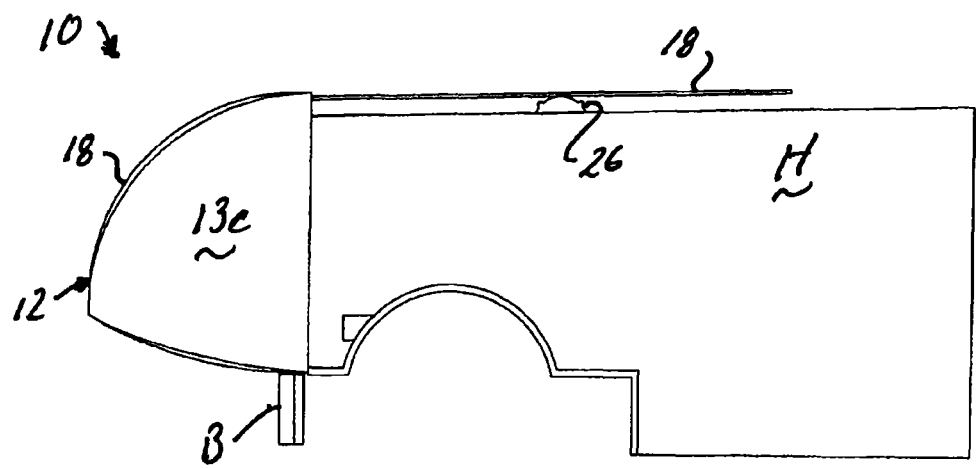

Referring to FIGS. 2C and 3A-3C, cowling assembly 10 is shown in relation to the front end of truck K, hood H, and radiator R. As shown in the drawings, the cowling assembly is attached or mounted to the front of the hood so that frame 12 of the assembly covers radiator R. A sheet or flexible cover panel 18, hereafter cover panel or cover, is movable by a drive mechanism 20, as described below, over the front of the radiator to block or unblock the air flow passages P defined by the panels 14a-14d and frame 12. This is as shown in FIG. 3B in which cover panel 18 is moved to substantially block all air flow to the radiator. FIG. 3C illustrates the operating condition in which cover panel 18 is substantially withdrawn from the front of assembly 10 for the passages P to allow significant air flow to the radiator. As discussed hereafter, a curved track 17 (see FIGS. 12-14, 26A and 26B) is formed on the inner wall of each frame section 13c, 13d to capture the outer margin of the cover panel or sheet and guide its movement back and forth. It will be understood by those skilled in the art that track 17 may be heated to insure smooth and free movement of a cover panel or sheet over the front of the radiator in cold and icy conditions. No guide track 17 is, however, required if cover panel 18 has a slightly curved contour and is relatively rigid in construction.

Referring to FIGS. 16-19B, cowling assembly 10 may employ a series of cover panels 18 interconnected as shown in the drawings. In FIG. 16, the cover is shown to be made from a sheet of lightweight plastic material having a honeycomb construction or similar rigid structural form. Cells 18a of the sheet are hollow cells. The cells provide strength and durability and promote a lightweight construction. It will be appreciated by those skilled in the art that the panel may be coated with a thin film of material to, for example, effect heating of the panel, or to protect the panel from degradation due to exposure to sunlight or various pollutants.

Figure 17:
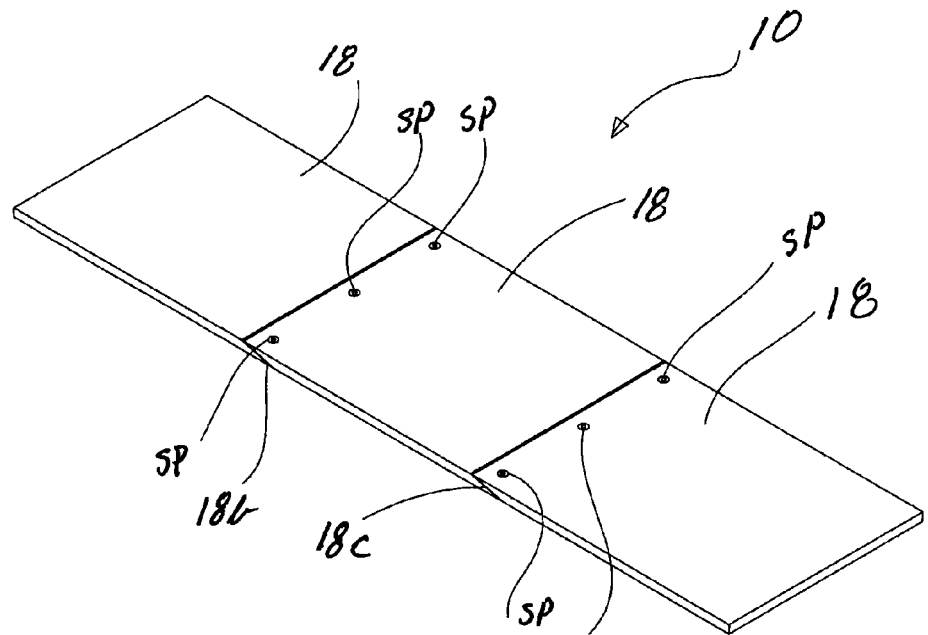
FIG. 17 illustrates a plurality of interconnected panels.
Figure 18A:
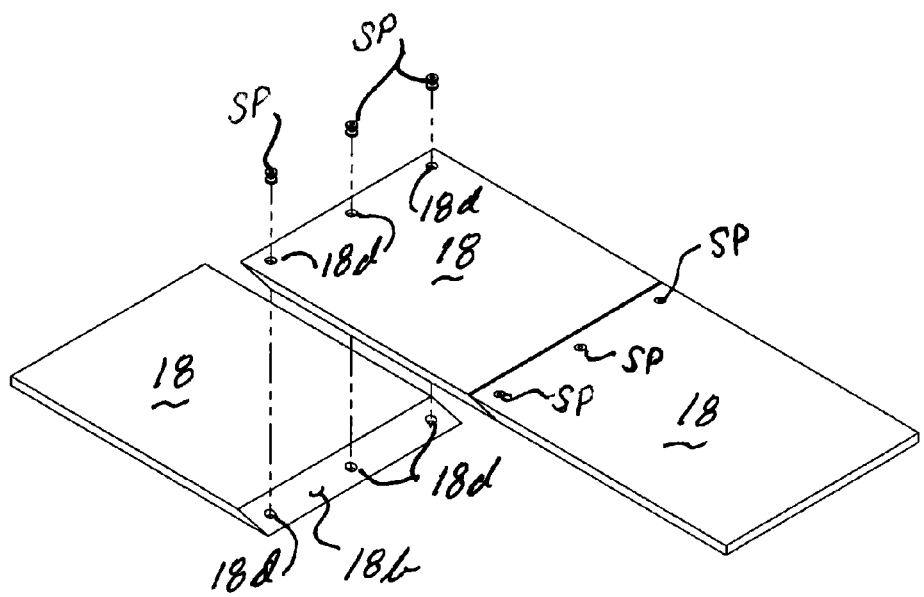
FIG. 18A is a perspective view illustrating how the panels are connected together and FIG. 18B is side view of the interconnected panels.
Figure 18B:
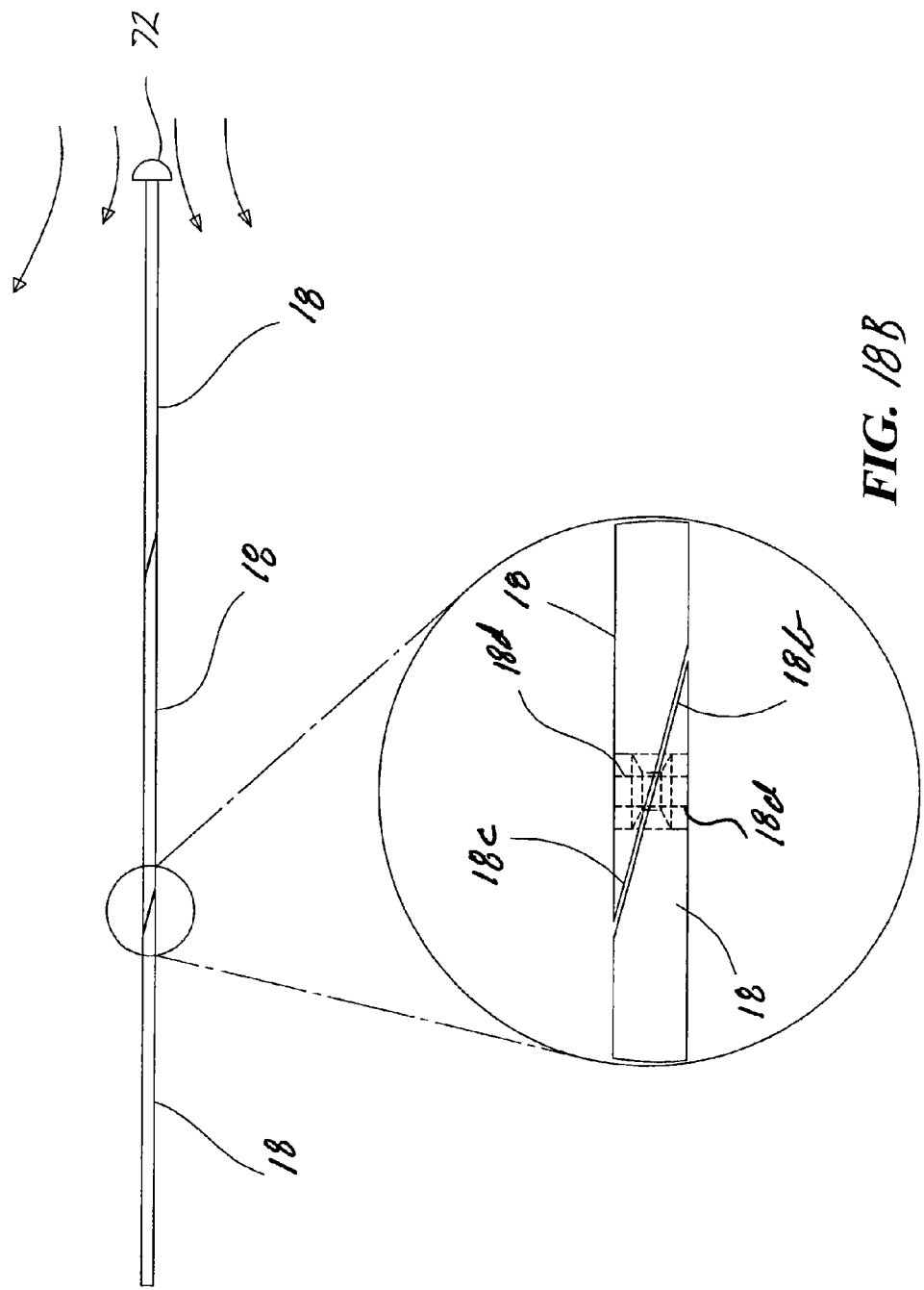

In FIG. 17, three cover panels 18 are shown to be interconnected for use with the cowling assembly. Again it will be understood that cowling assembly 10 may employ more or fewer panels depending upon the particular vehicle installation. As shown in the drawings, when more than one cover panel 18 is to be joined together, the abutting edges of the panels are appropriately beveled as indicated at 18b and 18c. Interconnection of the panels is achieved using a plurality of shear pins SP which are inserted through holes 18d formed in the respective abutting ends of the panels. Referring to FIGS. 19A and 19B, a shear pin SP is shown to have generally cylindrical shape with sections SPa and SPb at each end which are greater in diameter than the center section SPc of the pin.

Figure 4A:
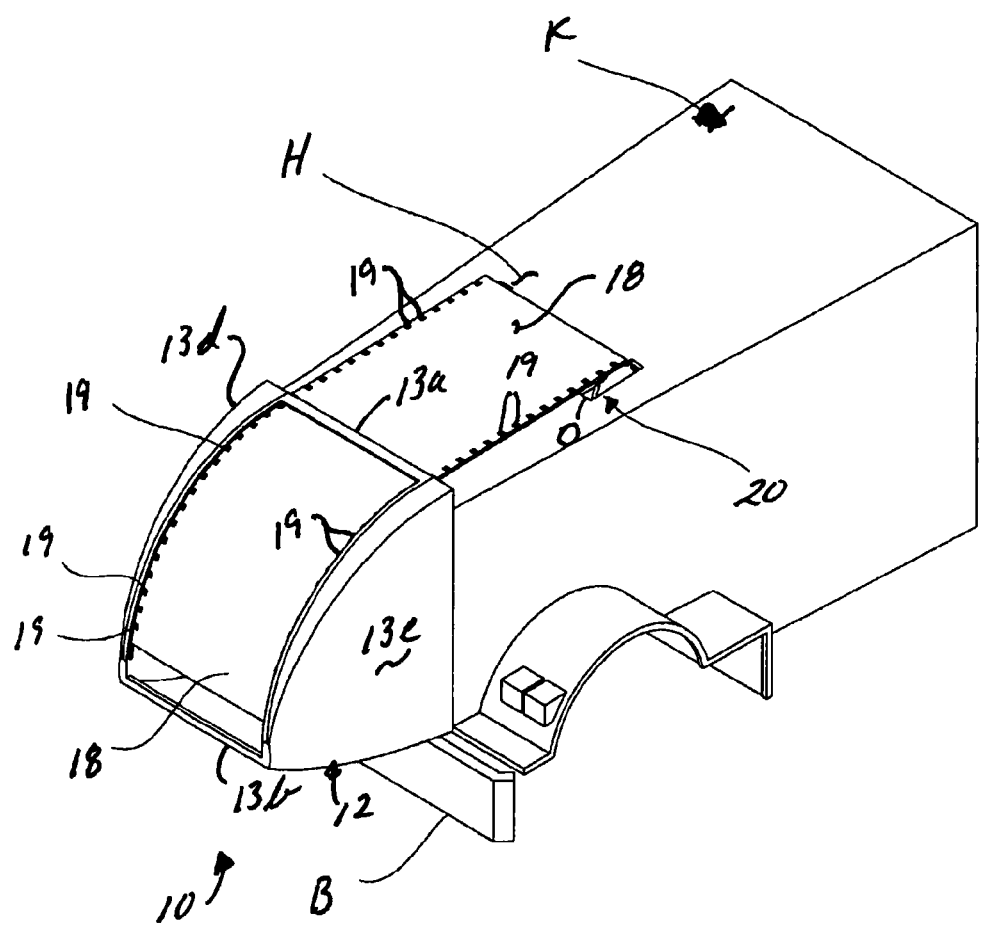
FIG. 4A is a perspective view of the cowling assembly in a substantially dosed position.
Figure 4C:
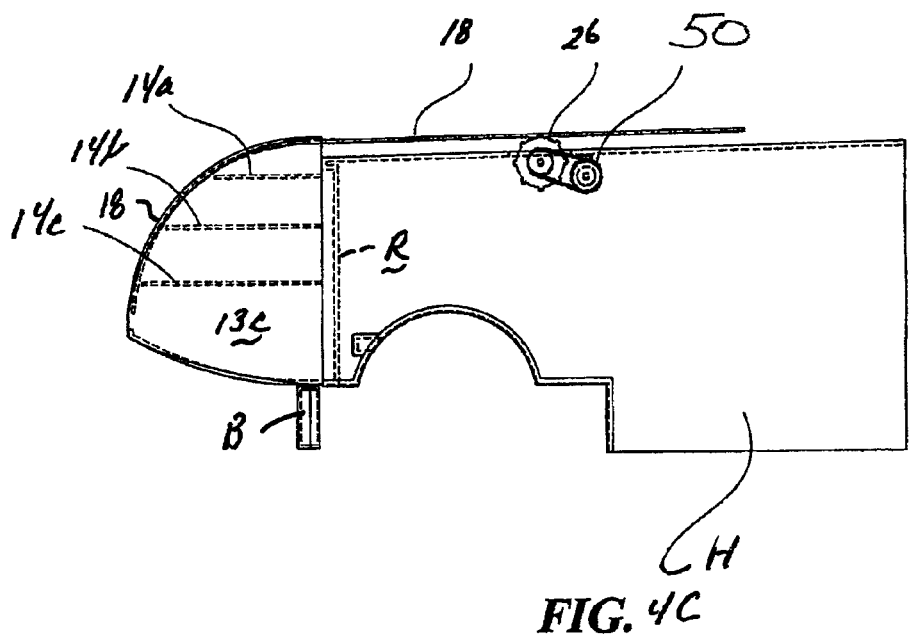
Figure 4D:
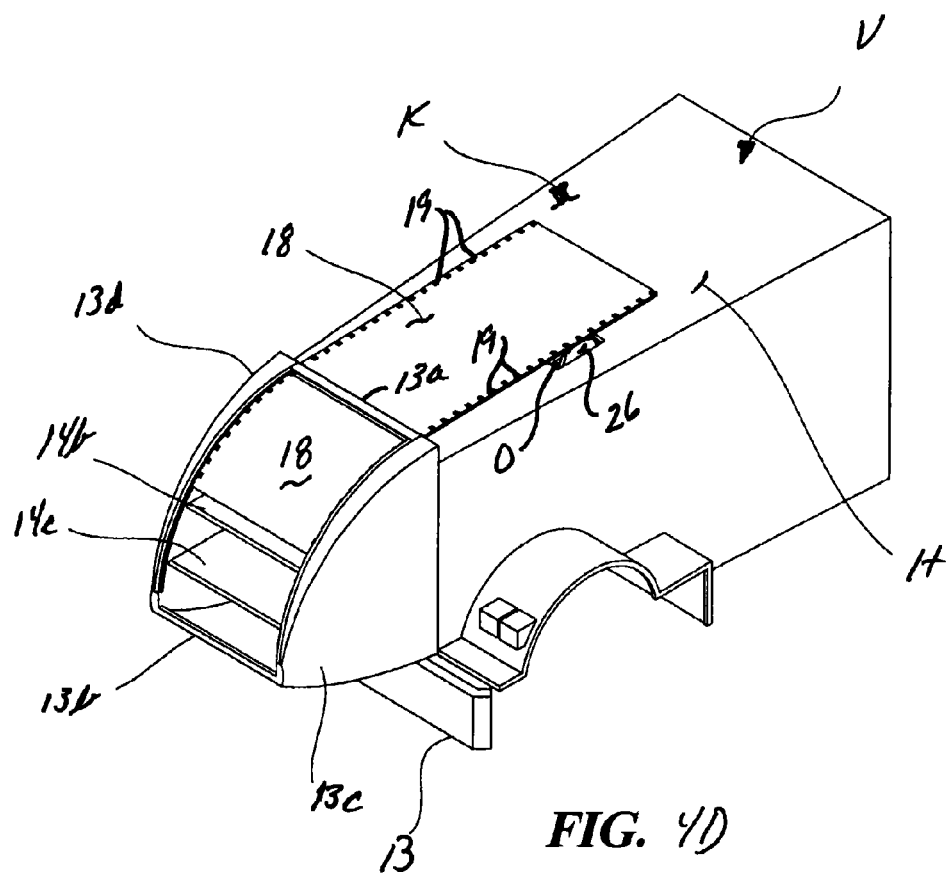
FIG. 4D is a view similar to FIG. 4A with the cowling assembly in a more open position.
Figure 5A:
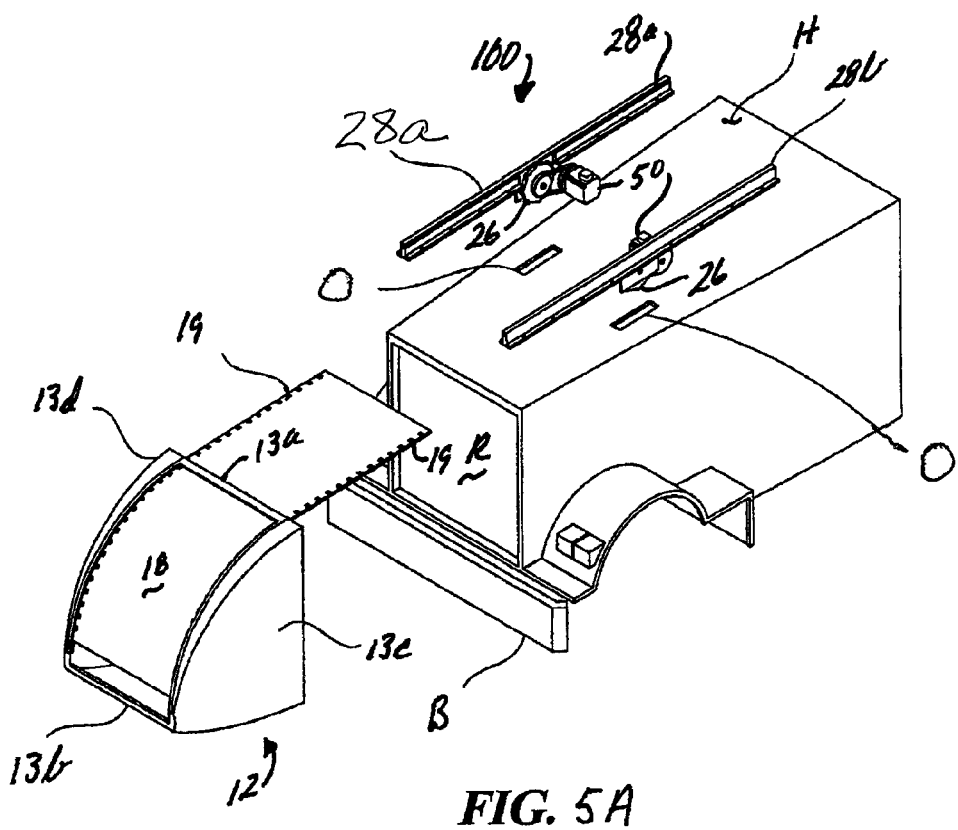
FIGS. 5A-5E illustrate a second embodiment of the invention employing tracks over which a panel is moved.
Figure 5B:
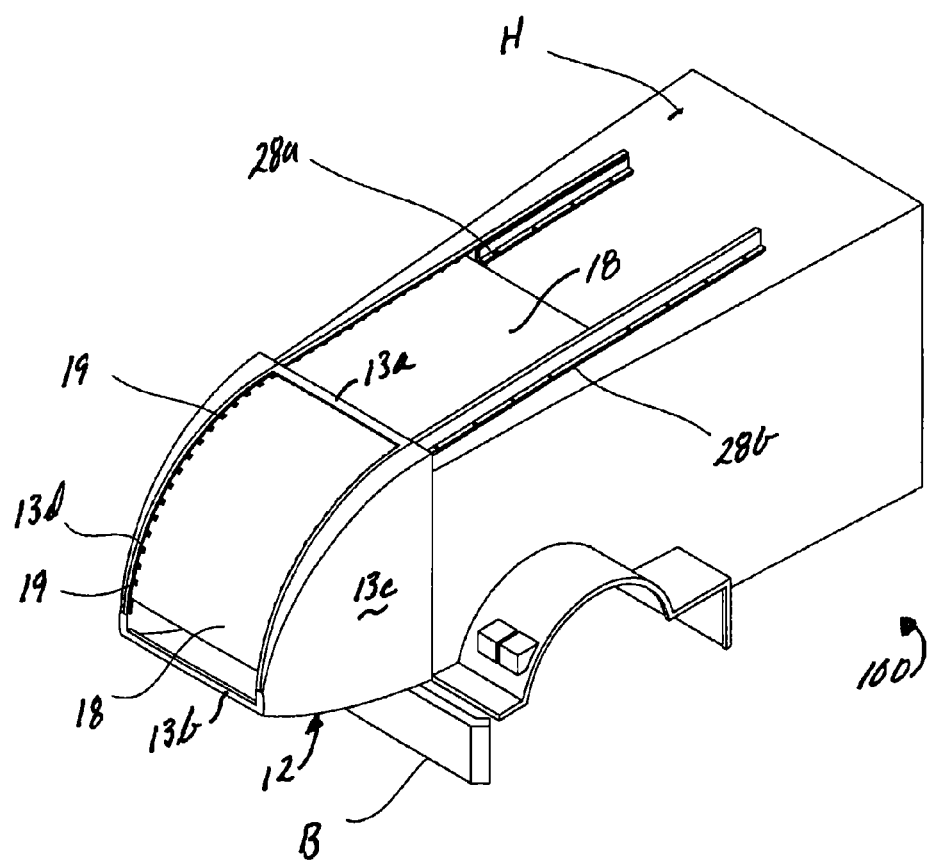
Figure 5C:
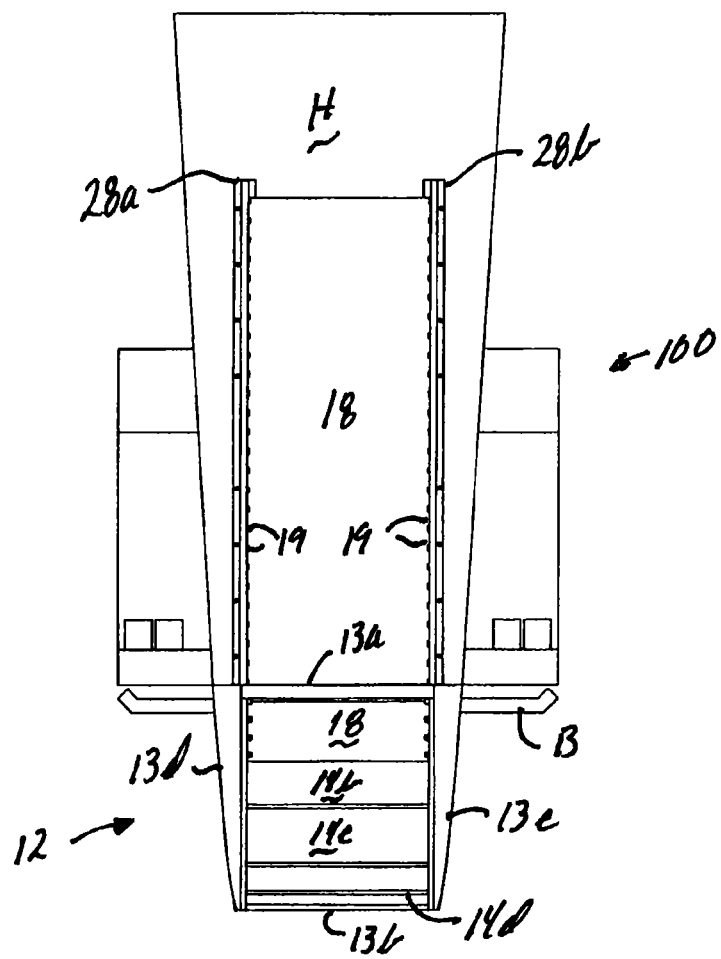
Figure 5D:
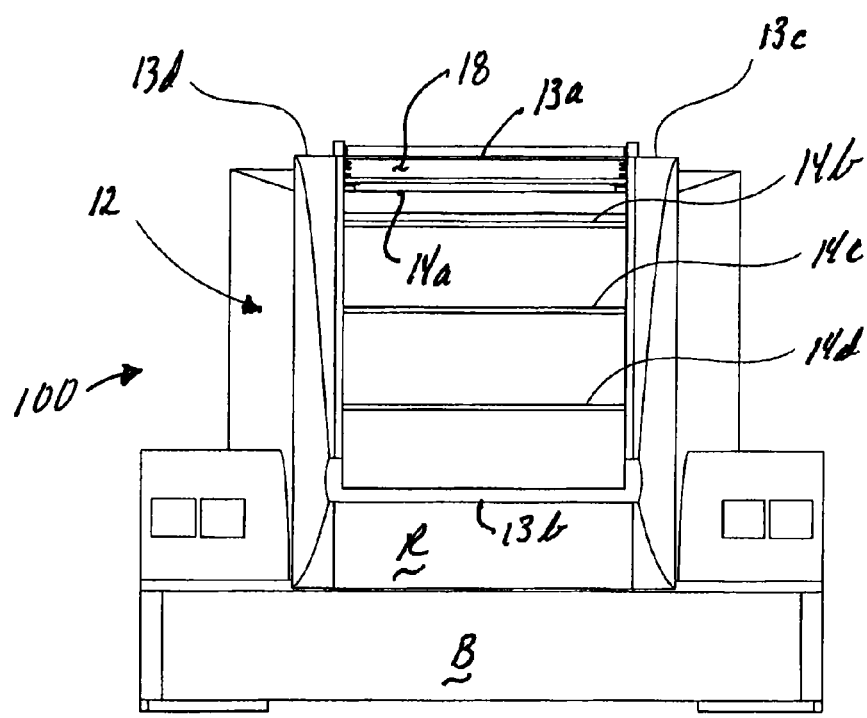
Figure 5E:
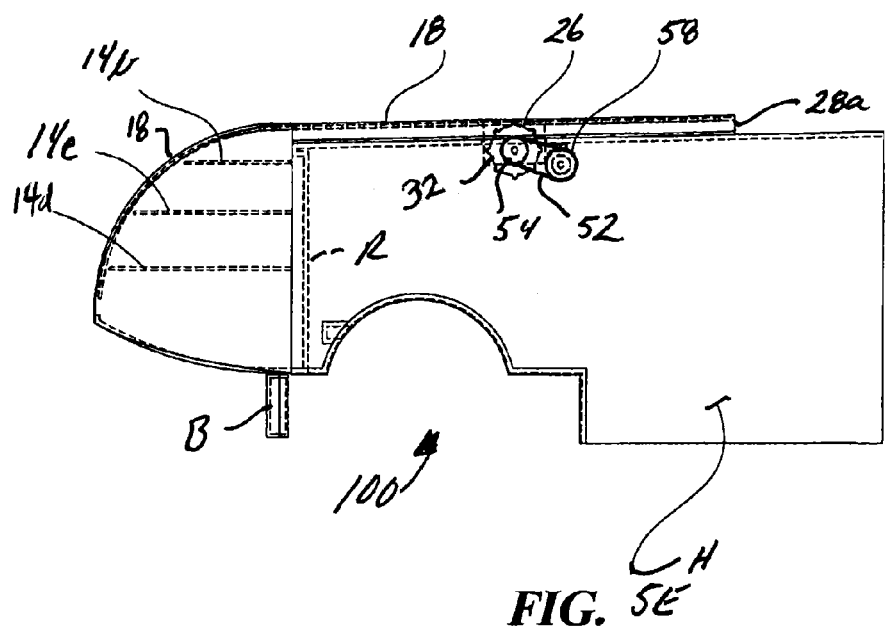

FIGS. 4A-4D respectively illustrate cowling assembly 10 from different perspectives when the assembly is in a position similar to that shown in FIG. 3B. As shown in FIGS. 4C and 4D, a toothed gear 26 of drive mechanism 20 extends through an opening O in the top of hood H. Adjacent each side of sheet 18 forming a cover panel are a series of equidistantly spaced holes 19 by which toothed gears 26 of drive mechanism 20 move cover panel 18 back and forth over the front of cowling assembly 10 and radiator R. The gears are mounted beneath hood H and extend through the openings O in the top of the hood for teeth 26t of each gear to engage the holes along the respective sides of the cover panel.

Inwardly from each respective series of spaced holes 19 is an aperture 32. The hook end 34 of a constant tension spring assembly 36 is fitted into each aperture 32. The tension spring assembly provides a "fail safe" in the event of failure of drive mechanism 20 so to return cover panel 18 to its fully withdrawn position in which radiator R is completely open to air flow. The spring assembly is installed beneath hood H and the spring elements project through openings 38 in the top of the hood. A mounting base 40 for assembly 36 is shown in FIG. 4C.

Figure 6A:
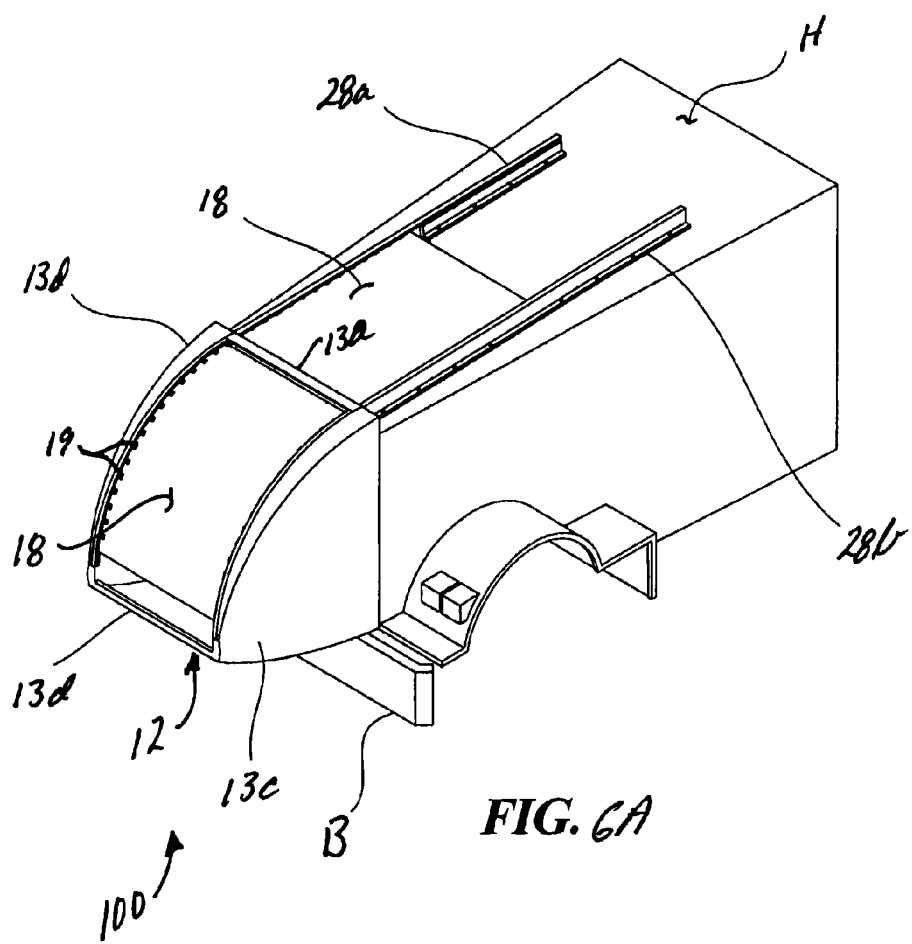
FIGS. 6A-6C illustrate various degrees of opening of a radiator to air flow by operation of the second embodiment.
Figure 6B:
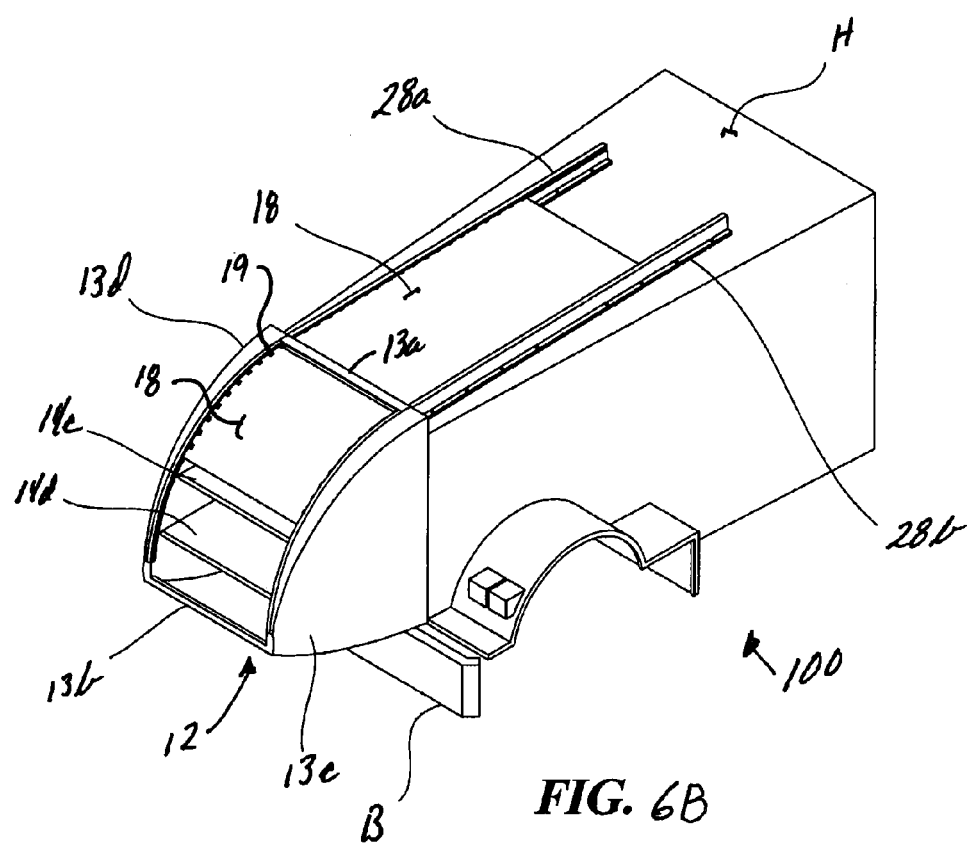
Figure 6C:
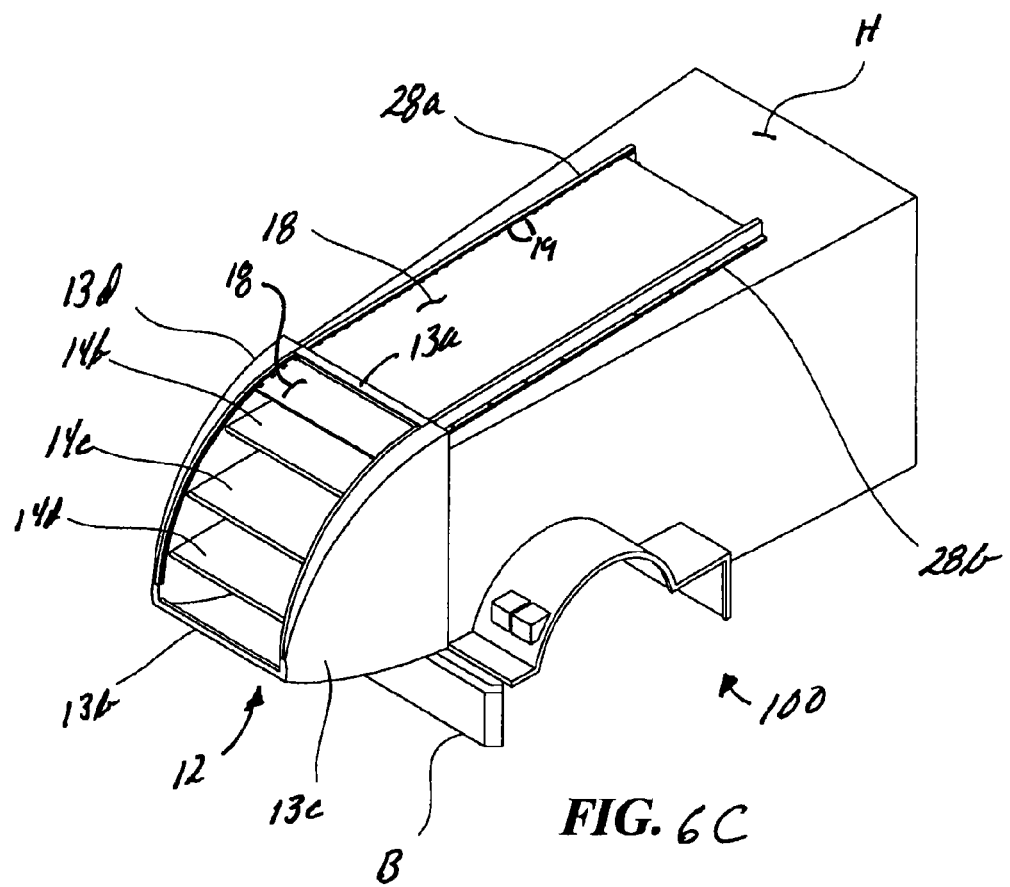

FIGS. 5A-5E and 6A-6C illustrate a second embodiment 100 of the cowling assembly. Assembly 100 has the same basic construction features as described above with respect to assembly 10. Now, however, assembly 100 includes a set of tracks 28a, 28b which extend longitudinally of hood H, parallel to each other along opposite sides of the hood. The tracks 28a, 28b interconnect with the tracks 17 formed in frame 12 for cover panel 18 to further be drawn back and forth over both sets of tracks, particularly as shown in FIGS. 6A-6C to open the front of radiator R to air flow. Again adjacent each side of cover panel 18 are a series of equidistantly spaced holes 19 which are engaged by toothed gears 26 of drive mechanism 20 to move cover panel 18 back and forth over the front of cowling assembly 10 and radiator R. In this regard, FIGS. 6A-6C respectively illustrate approximate 30%, 50%, and 70% openings of radiator R.

Figure 7A:
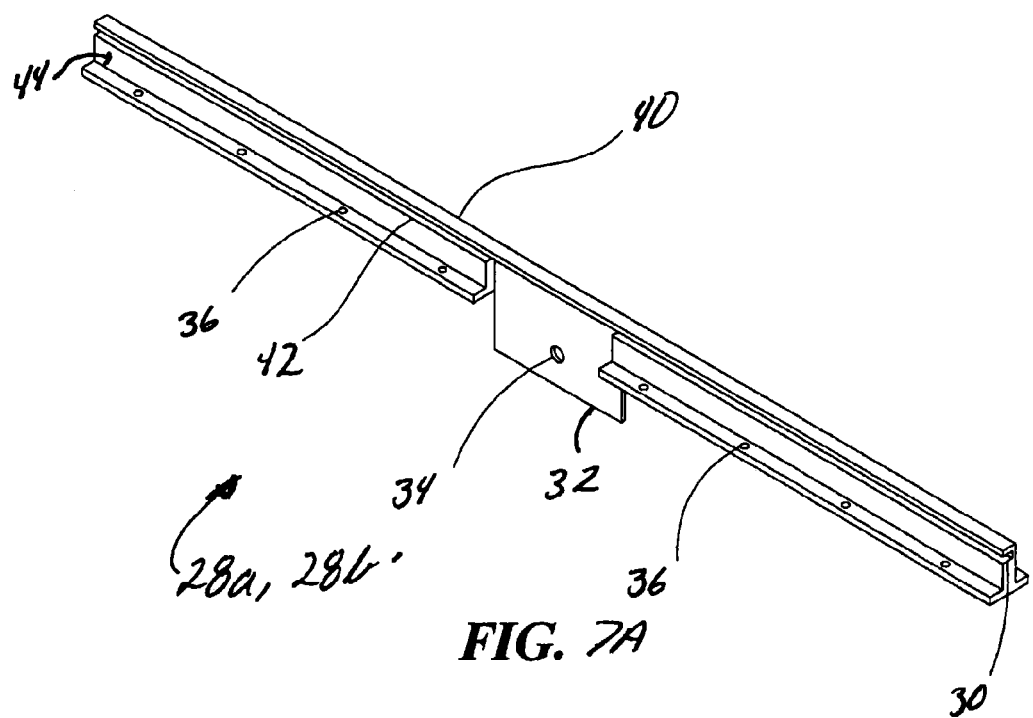
FIGS. 7A and 7B are respective perspective and elevation views of a track used in the second embodiment of the cowling assembly.
Figure 7B:
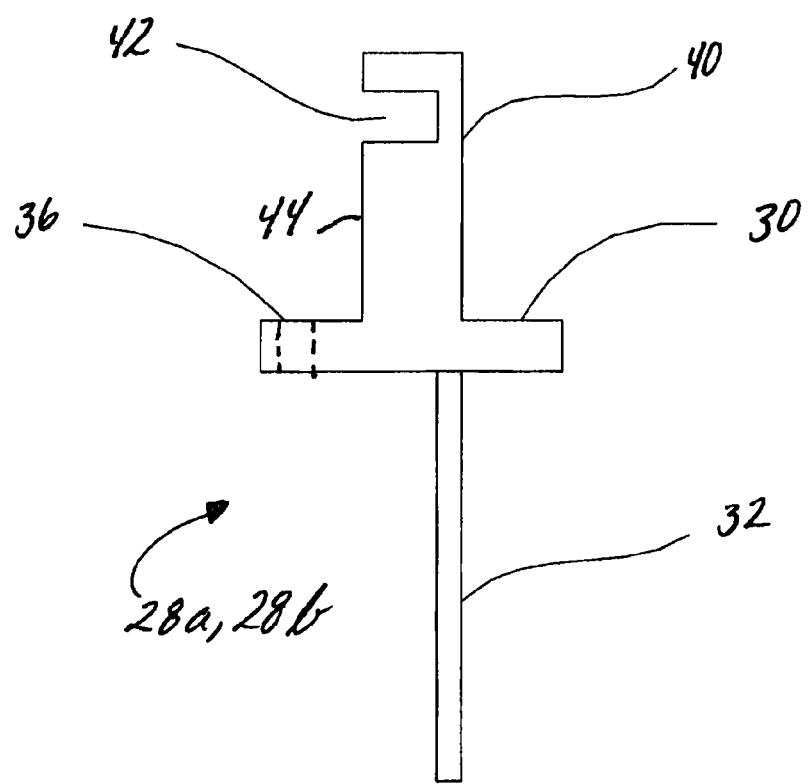
Figure 8A:
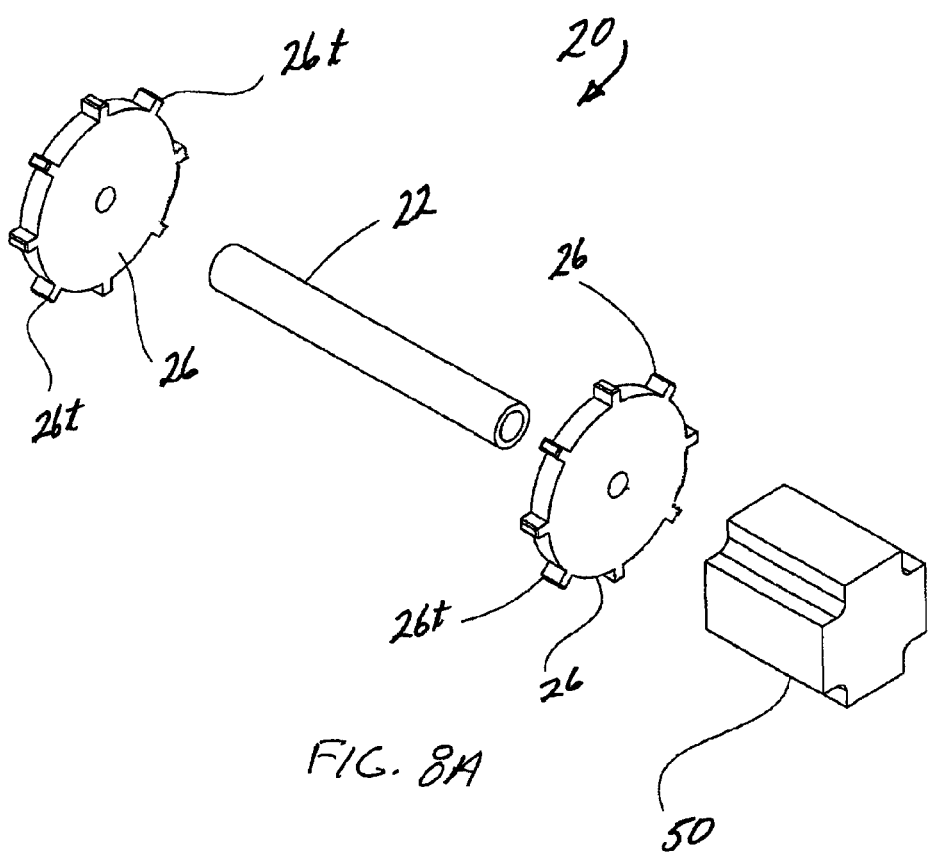
FIGS. 8A, 8B and 8C illustrate a drive mechanism for use with the first embodiment of the cowling assembly.
Figure 8B:
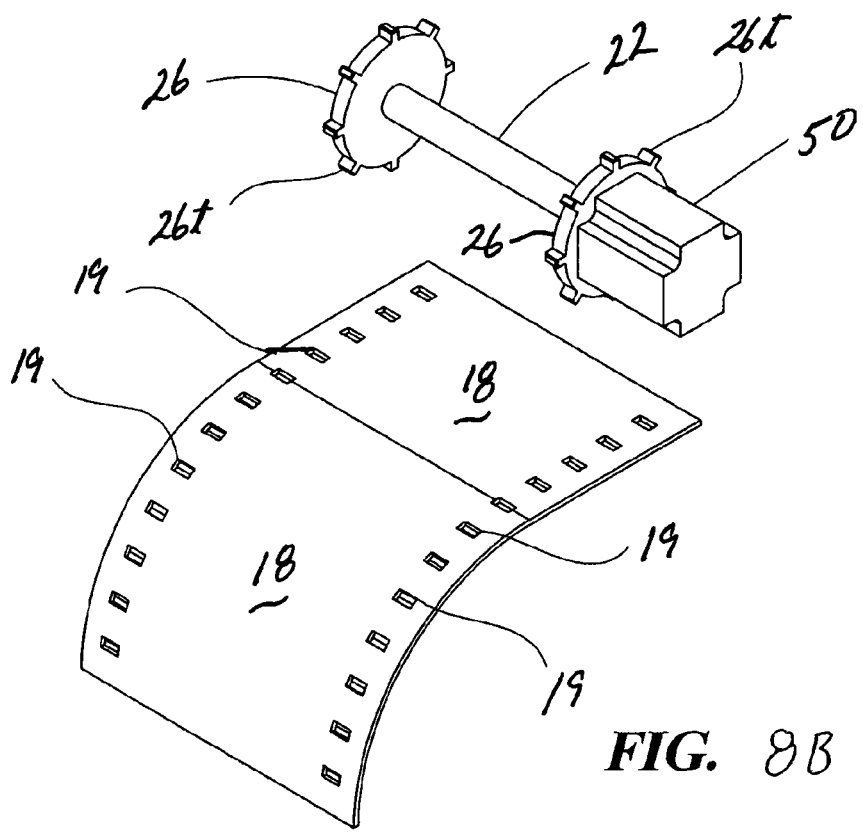
Figure 8C:
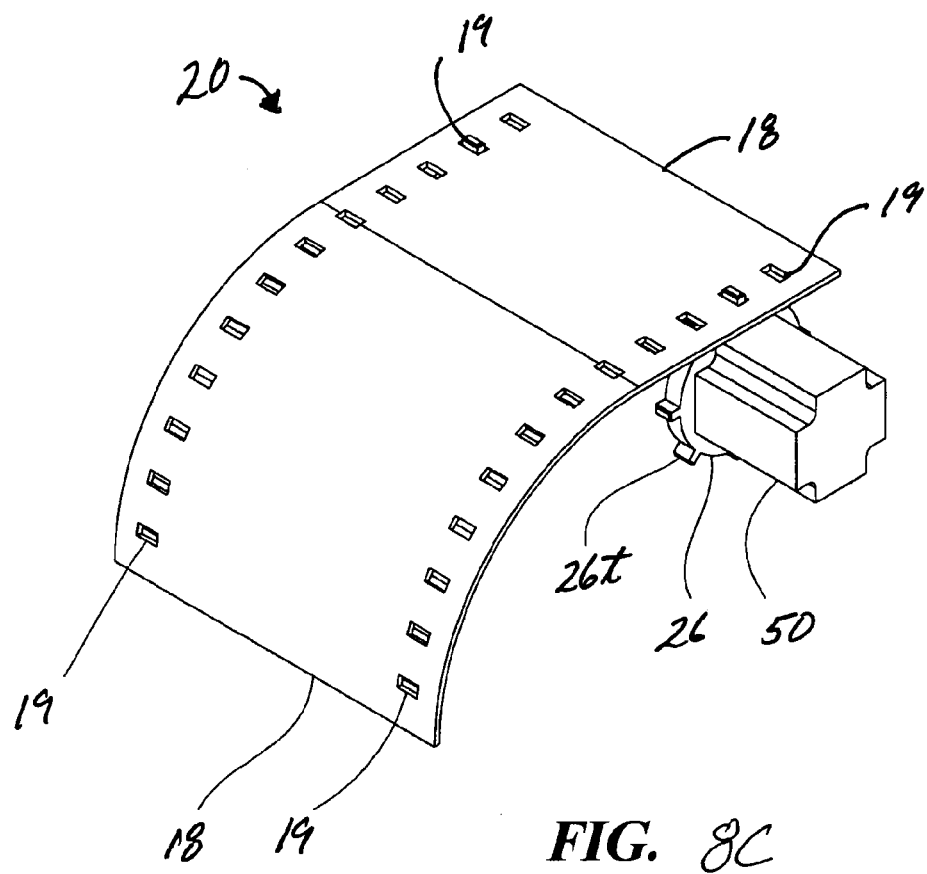
Figure 9A:
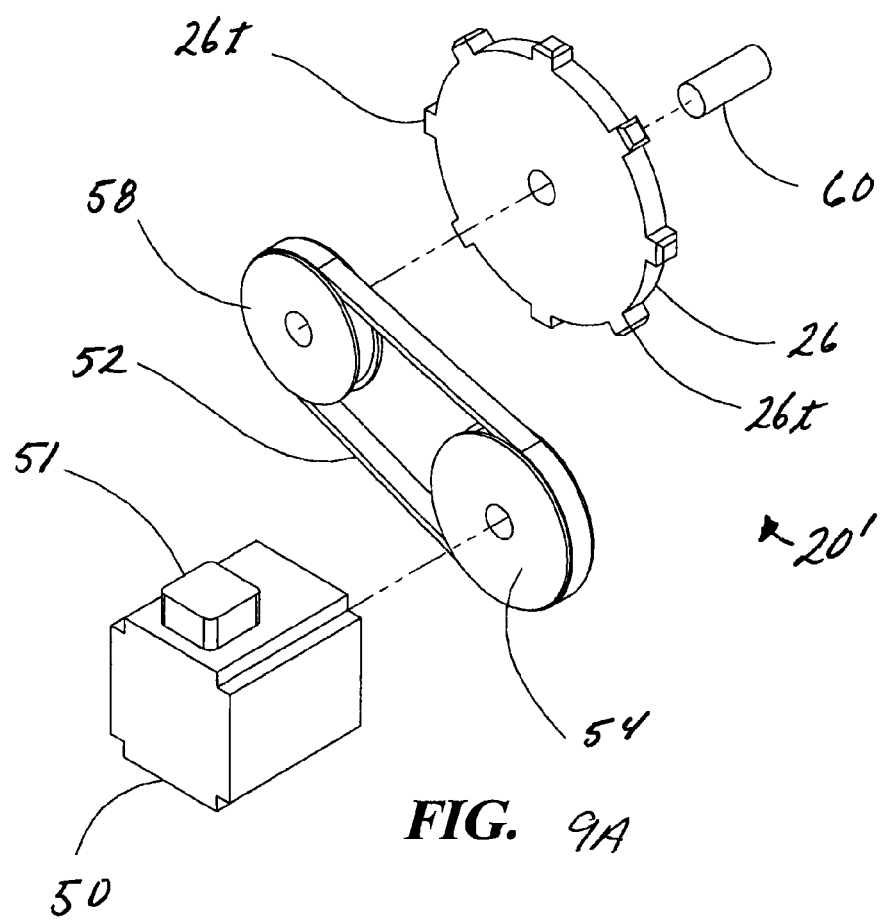
FIGS. 9A-9C illustrate a drive mechanism for use with the second embodiment of the assembly.
Figure 9B:
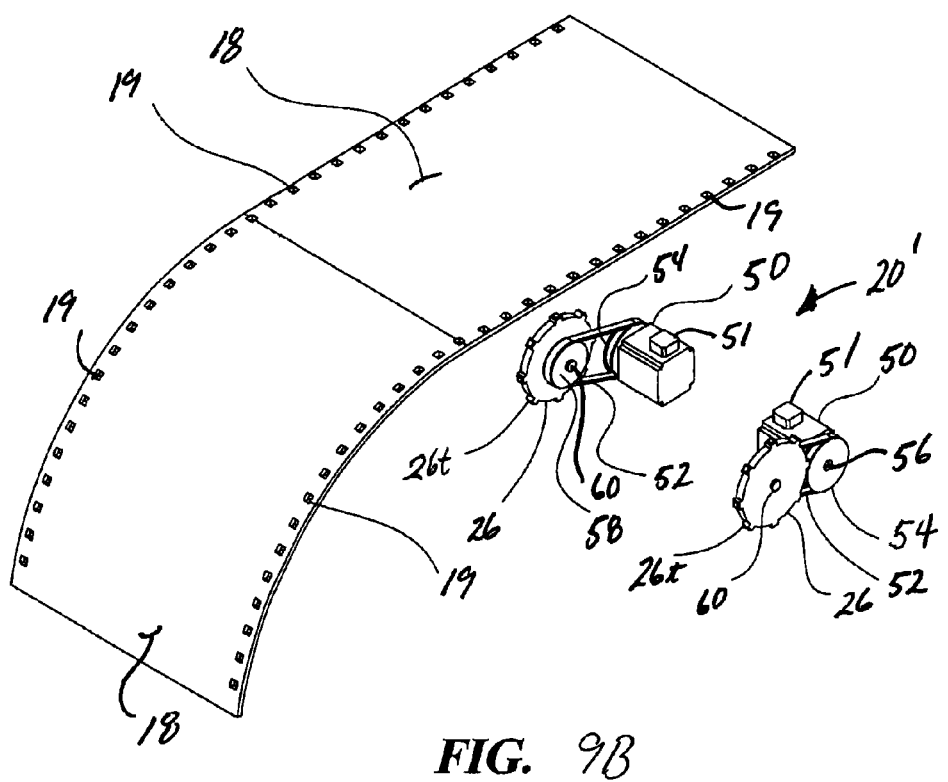
Figure 9C:
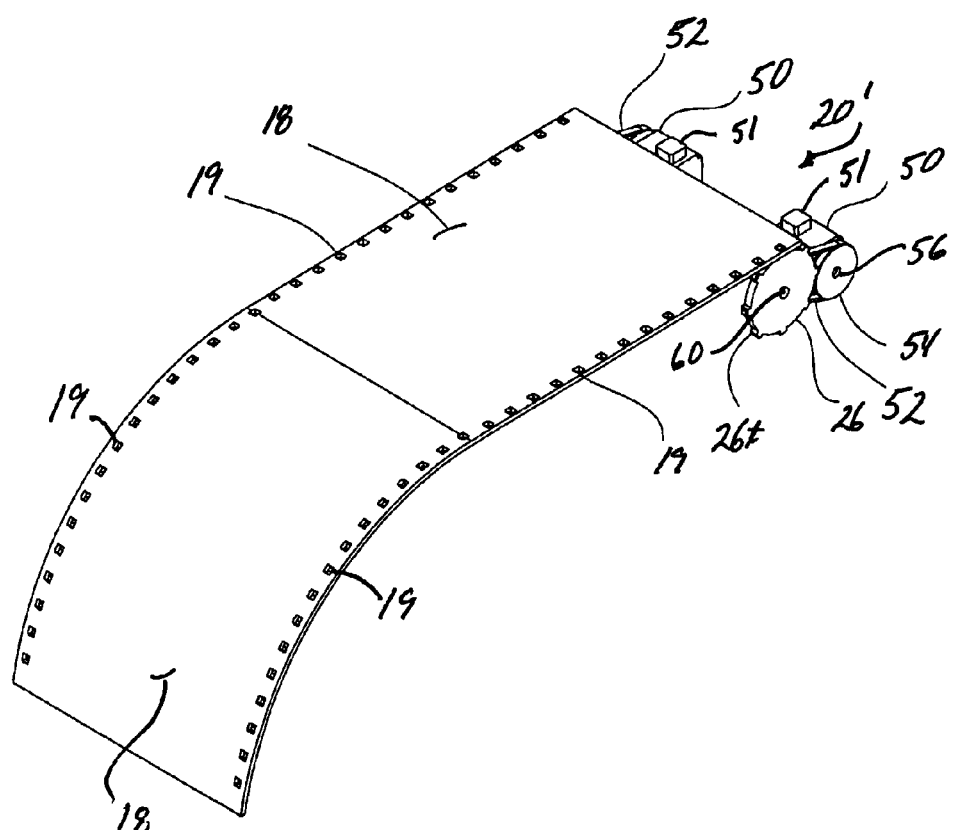
Figure 10A:
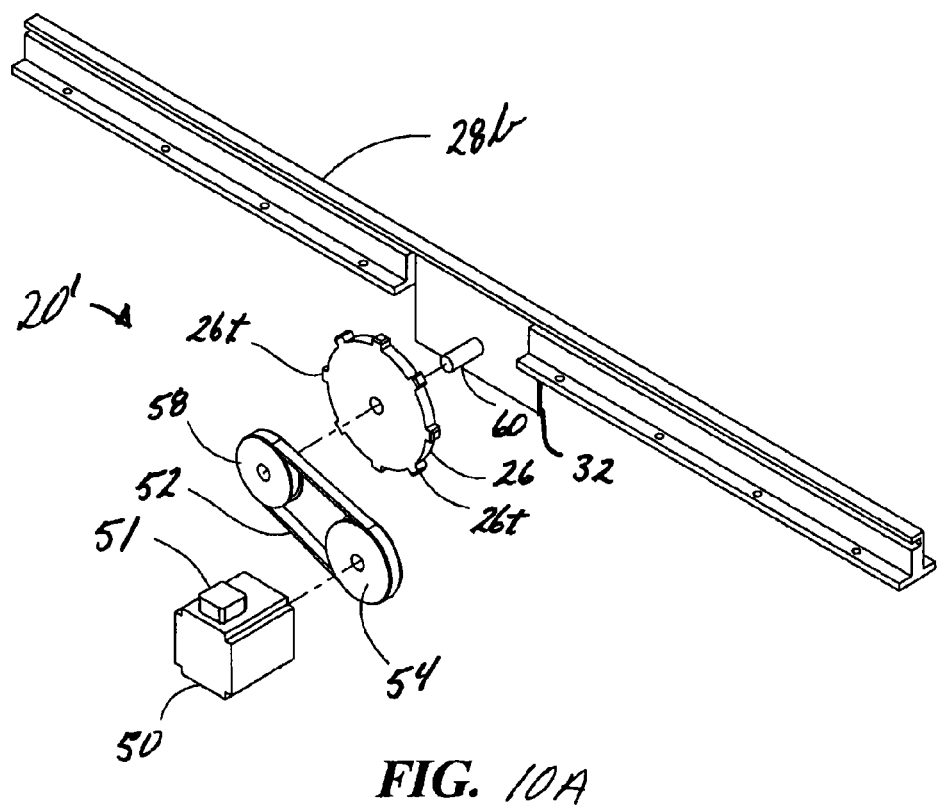
FIGS. 10A-10C illustrate another embodiment of the drive mechanism for use with the second embodiment of the invention.
Figure 10B:
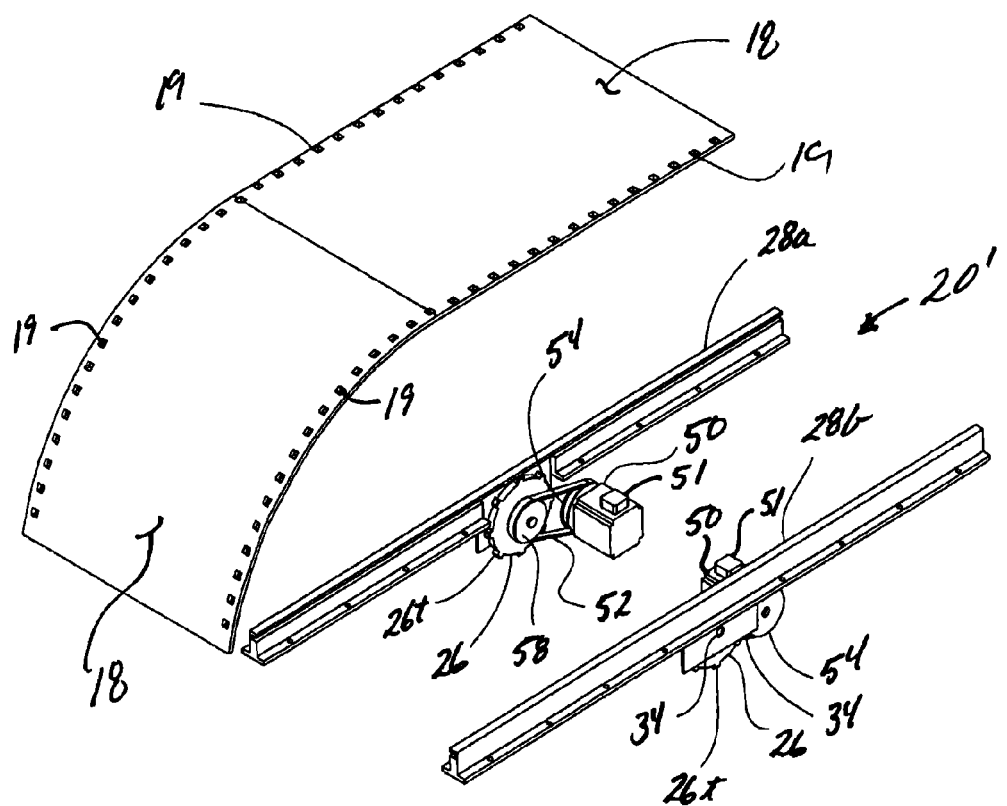
Figure 10C:
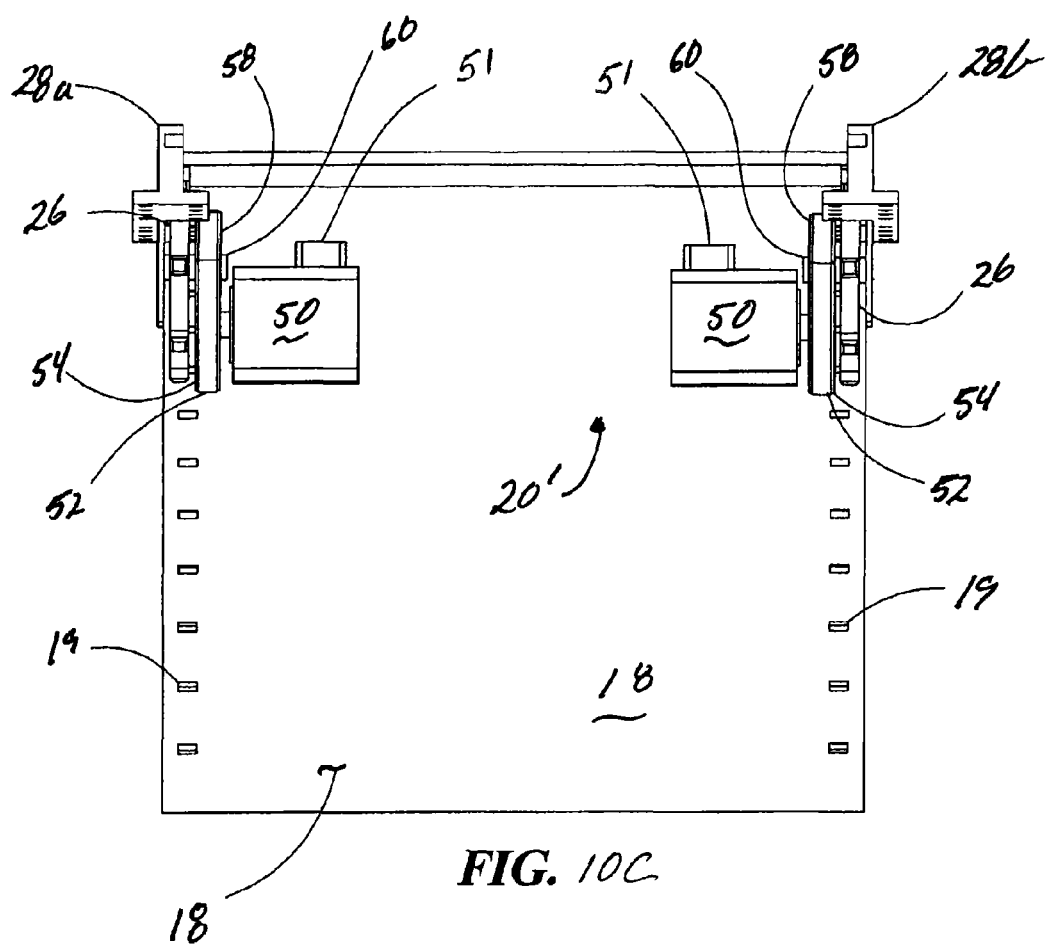

Tracks 28a, 28b are better shown in FIGS. 7A and 7B. Each track has a horizontal flange 130 which abuts against the roof of hood H when the rail is mounted in place. A vertically extending flange 132 depends from the base of flange 130 and extends through an opening (not shown) in the top of the hood to mount a rail to the hood. Flange 132 has a hole 134 for connecting parts of drive mechanism 20 to the rail as will be described. Spaced holes 136 are formed on the inner section of flange 130 for mounting attachments (screws, bolts, etc.) to be fitted in place to attach the track to the hood. Each rail has a vertical section 140 projecting above the top of the hood, and a generally rectangular shaped race or track 142 is formed in an inner face 144 of section 140. The outer ends of cover panels 18 are received in the tracks which serve as guides for movement of the panels through the track.

Referring to FIGS. 8A-8C, 9A-9C, and 10A-10C, a drive mechanism 20 is for use with the first embodiment 10 of the cowling assembly and a drive mechanism 20' for use with second embodiment 100 of the assembly. In drive mechanism 20, a tooth 26t of respective toothed gears 26 engages holes 19 along the respective sides of panel 18. The gears 26 are bi-directionally driven by respective motors 50. To accomplish this, each motor 50 is connected to a pulley 54 by a drive shaft 56 to rotate the pulley in the appropriate direction. Pulley 54, in turn, is connected to a pulley 58 by a belt 52. Gear 26 and pulley 58 are commonly mounted on a shaft 60.

For cowling assembly 100, drive mechanism 20' has one end of each shaft 60 installed in the opening 134 in vertical flange 132 of the respective tracks 28a, 28b so to mount the entire assembly in place. A sensor 51 installed on each motor provides control information to a controller for the assembly as will be described.

Figure 11A:
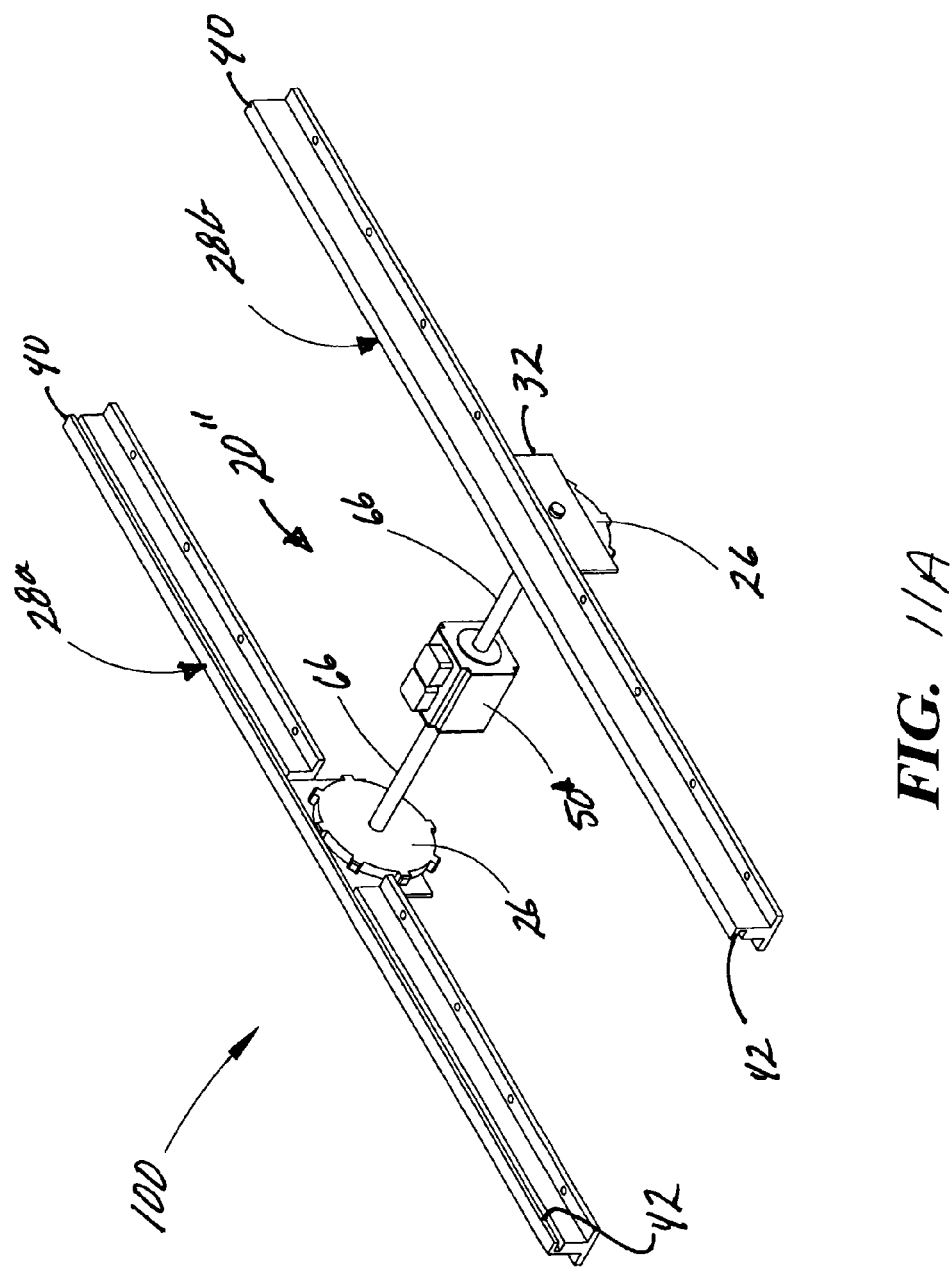
FIGS. 11A and 11B illustrate still another embodiment of the drive mechanism for use with the second embodiment of the invention.
Figure 11B:
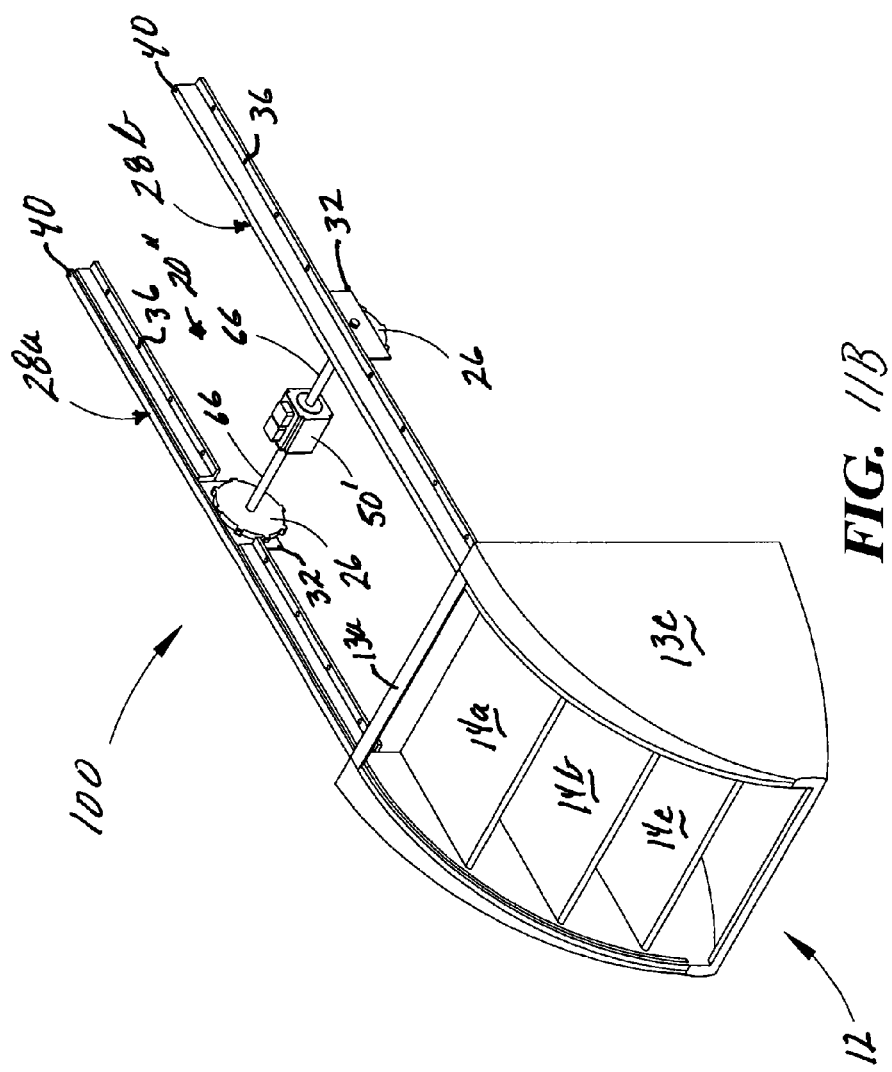

In FIGS. 11A-11B, a third embodiment 20" of the drive mechanism is also for use with embodiment 100 of the cowling assembly. Now, a motor 50' drives both toothed gears 26. Each gear is mounted to one end of a drive shaft 66 whose other end is connected to the motor. As shown in the drawings, motor 50' is mounted midway between the rails 28a, 28b.

Figure 12:
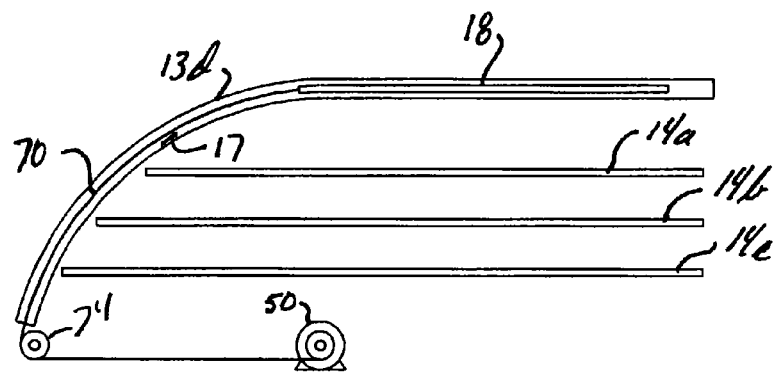
FIGS. 12-14 are sectional views of the cowling assembly illustrating different mechanical connections with a panel to move the panel over the radiator.
Figure 13:
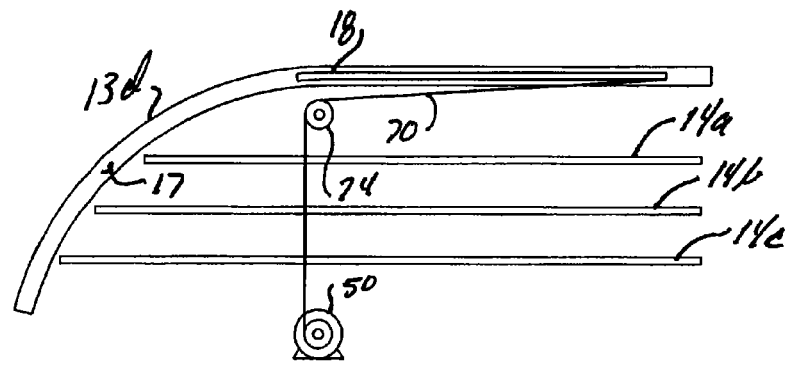
Figure 14:
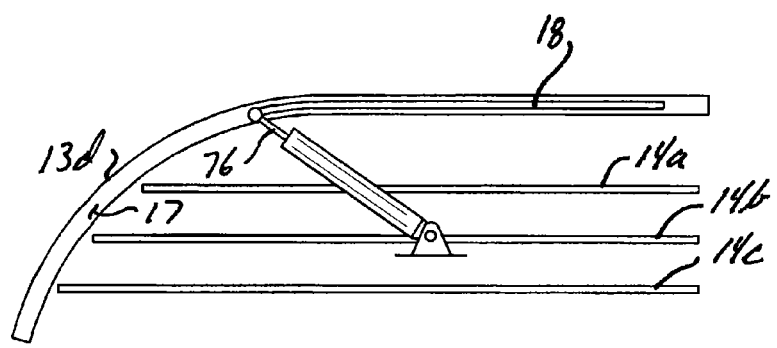

FIGS. 12-14 illustrate three alternate ways in which a cover panel 18 of cowling assembly 10 can be moved over and away from the front of radiator R. In the embodiment of FIG. 12, a wire 70 is attached to the front end of the cover panel. One end of wire 70 is connected to a bracket 72 which extends across the front of the panel (see FIG. 18B). The wire extends through track 17 and winds around a spool 74. The other end of the wire then connects to motor 50.

In the embodiment of FIG. 13, wire 70 is attached to the rear of cover 18. The wire then extends, not through track 17, but rather below the panel, around spool 74 which is now attached to the inner face of the frame sections 13c, 13d. The other end of the wire is again connected to motor 50.

In the embodiment of FIG. 14, a rod 76 is disposed in a pneumatic or hydraulic cylinder 78. The outer end of the rod attached to the front end of cover panel 18. When a vacuum is applied to cylinder 78, rod 76 is drawn into the cylinder pulling cover 18 forward along track 17. When the vacuum is released, the rod, which is spring loaded, extends out from the cylinder, causing the panel to be pushed back along track 17.

Figure 15A:
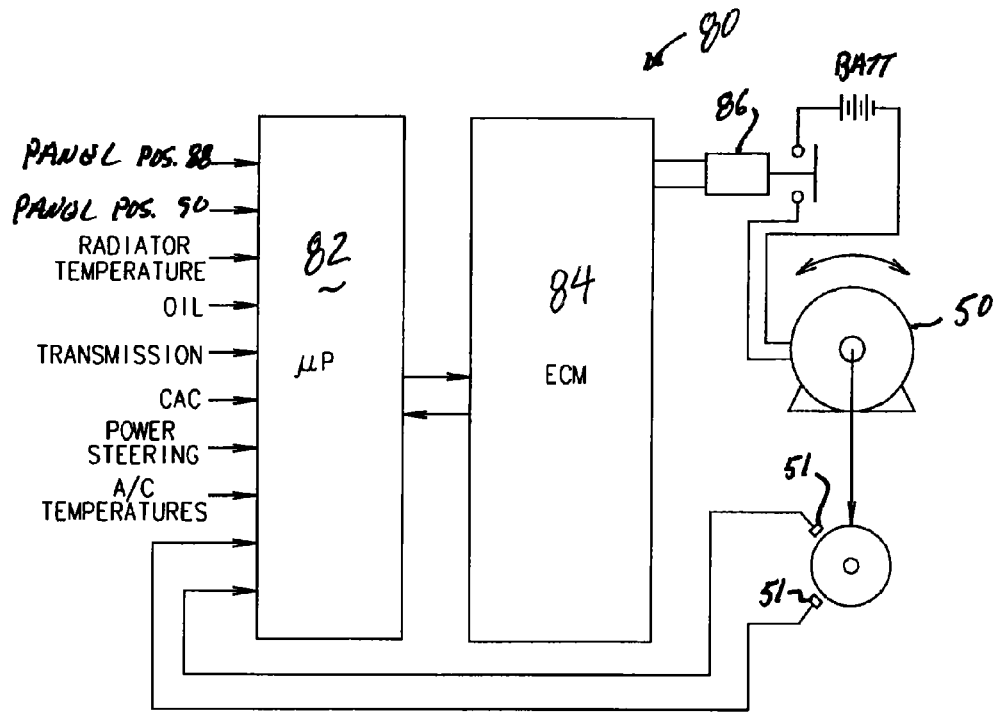
FIGS. 15A-15C are block diagrams of control systems for operating the panel drive mechanism.
Figure 15B:
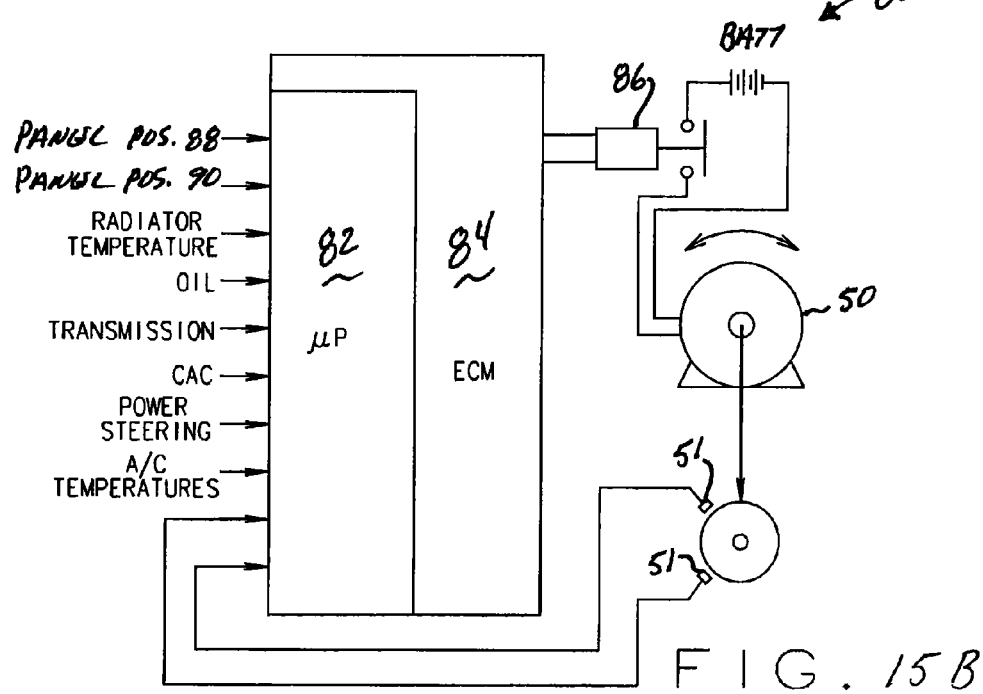
Figure 15C:
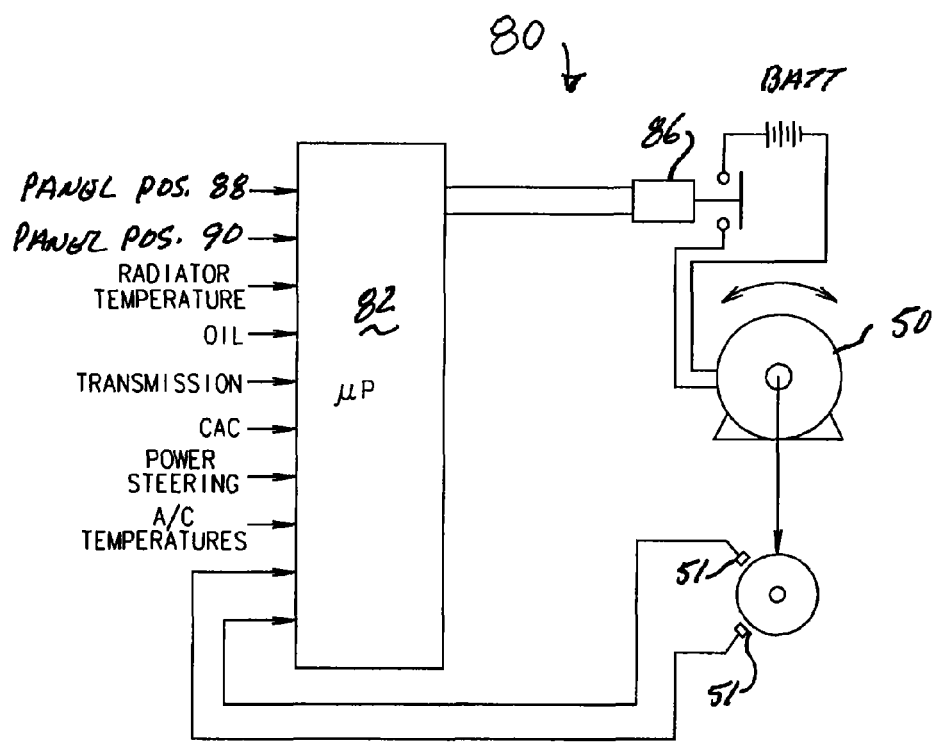

Referring to FIGS. 15A-15C, a controller 80 of the invention controls operation of the cowling and its panels using a microprocessor (µP) 82 which can be incorporated into the electronic control module (ECM) 84 of the vehicle or can be a standalone processor. As is known in the art, motor 50 is a bi-directional DC motor which is supplied power from the vehicle's battery BATT through a solenoid switch 86 whose operation is controlled by an output from the microprocessor. A variety of inputs are supplied to microprocessor 82 from sensors installed on or about the vehicle, or shaft output sensors, in order to determine the location of the sheets or panels and to provide appropriate feedback for operational control. These include, but are not limited to, the ambient air temperature, vehicle speed, and position sensors that indicate the degree of coverage of the radiator by the panels. The microprocessor is programmed to utilize this information to determine a) if the radiator should be covered; and b) if so, how much of it should be covered. If the conditions are such that there should be coverage, then an output is supplied from the microprocessor to solenoid 86 so DC voltage is supplied to motor 50 to drive the motor in the appropriate direction to move or adjust the panel(s) to affect the desired amount of radiator coverage. Sensors 88, 90 installed on or about the cowling provide information to the microprocessor as to the position of the panels for the microprocessor to stop motor 50 when the panel is in position. One sensor indicates when the panel has reached its farthest extended position and the other sensor its fully retracted position. As noted, the encoders 51 on each motor also provide exact position information.

Further, although not shown in the drawings, the ECM can also control valves or an electric water pump for controlling water flow in radiator R.

Figure 20:
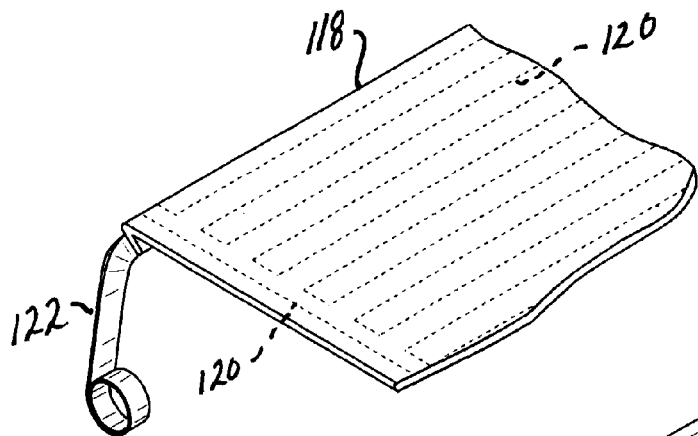
FIG. 20 is a perspective view of a sheet (partly broken away) used in the cowling assembly, the sheet having heating wires for deicing the sheet in cold weather conditions.
Figure 22:
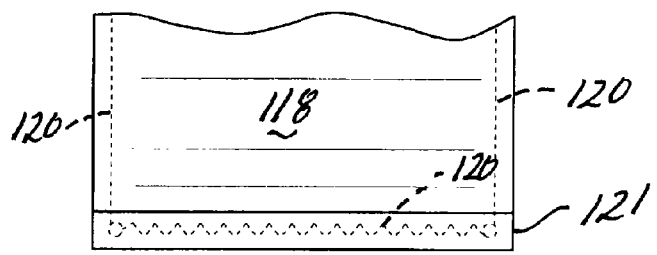
FIG. 22 is a plan view of the sheet illustrating a heat blade extending across the front end thereof.

Besides the cover panels 18 previously described, cowling assemblies 10 and 100 can also employ a sheet of material for covering the radiator. Referring to FIG. 20, a sheet 118 comprises a thin sheet of material. Preferably embodied in the sheet are electrically conductive wires 120 which allow the sheet to be heated in cold weather conditions. This makes it easier to operate the assembly in snow, sleet, and icy conditions. Further in this regard, and as shown in FIG. 22, a heated strip 121 extends across the front of sheet 118.

Figure 21:
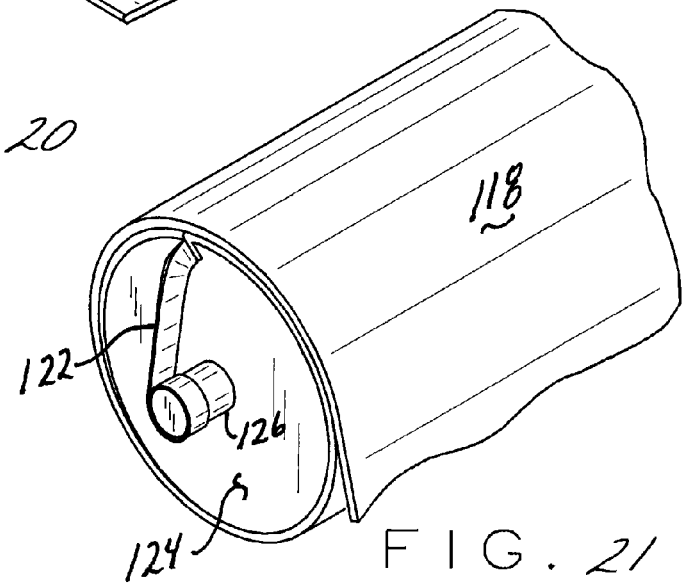
FIG. 21 illustrates the sheet in a coiled configuration.

Extending from one end of sheet 118 is a coiled strip 122. As shown in FIG. 21, strip 122 facilitates installation of sheet 118 on a roller 124 from which it is unwound when radiator R is be covered, and rewound when the radiator is to be uncovered. The coiled end of strip 122 is received on a round hub 126 which projects outwardly from an outer end of the roller.

Figure 23A:
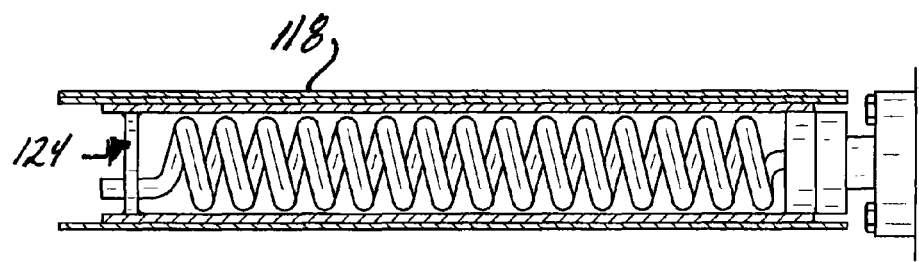
FIG. 23A is a sectional view of a roller on which the sheet is mounted and FIG. 23B is an end view of the roller with a coil spring installed for rewinding the sheet in event of motor failure.
Figure 23B:
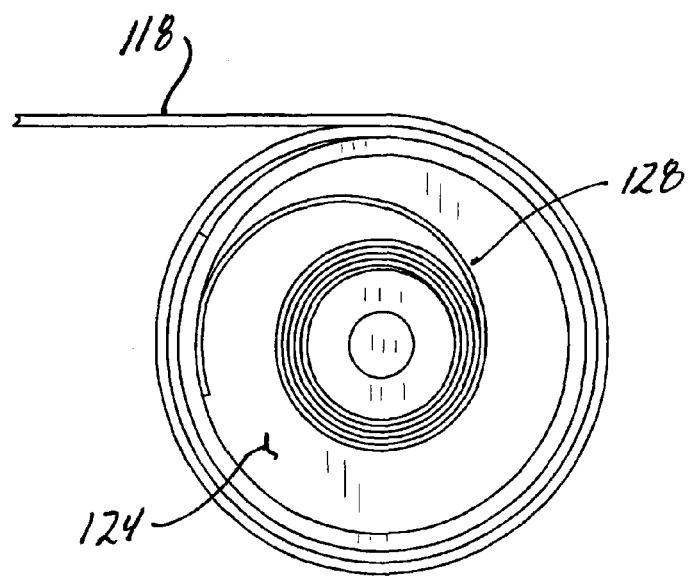

Referring to FIGS. 23A and 23B, FIG. 23A shows sheet 118 as installed on the roller, which has a spiral shaped shaft 127 used to rotate the roller when it is driven by motor 50 in one direction or the other. FIG. 23B shows a coil spring 128 which is used to bias roller 124 to its sheet 188 retracted position. The spring provides for fail-safe operation in the event of motor failure since the spring would rewind the sheet on the roller.

Figure 25:
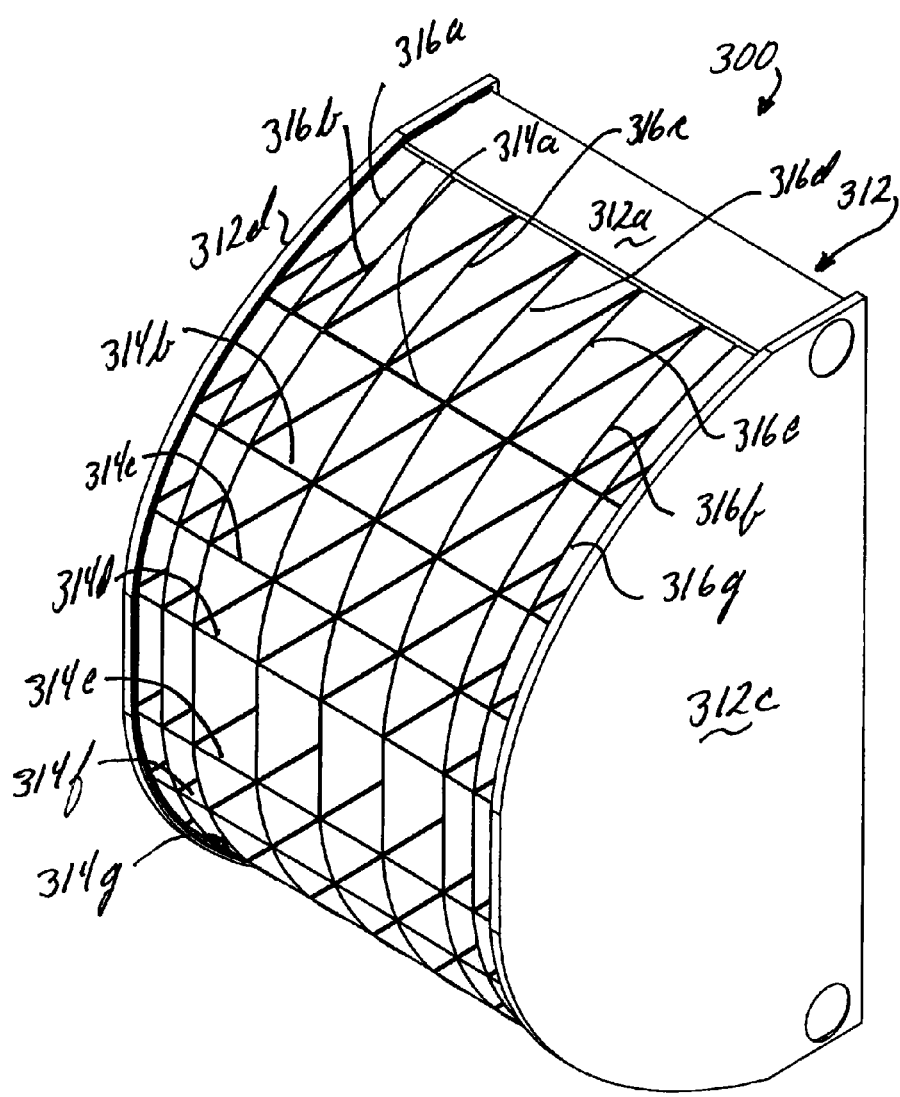
FIG. 25 is a perspective view of another embodiment of the cowling assembly for controlling air flow to the radiator of the vehicle.

Next, FIG. 25 represents another embodiment of the invention. Here, a cowling assembly 300 includes a frame 312 having top, bottom, and side members 312a-312d, bottom frame member 312b not being shown in the drawing. Assembly 300 includes interconnecting horizontal and vertical panels 314a-314g and 316a-316g respectively. These intersecting panels form cells of different sizes with each cell defining an air flow passage P for directing air to radiator R.

Figure 26A:
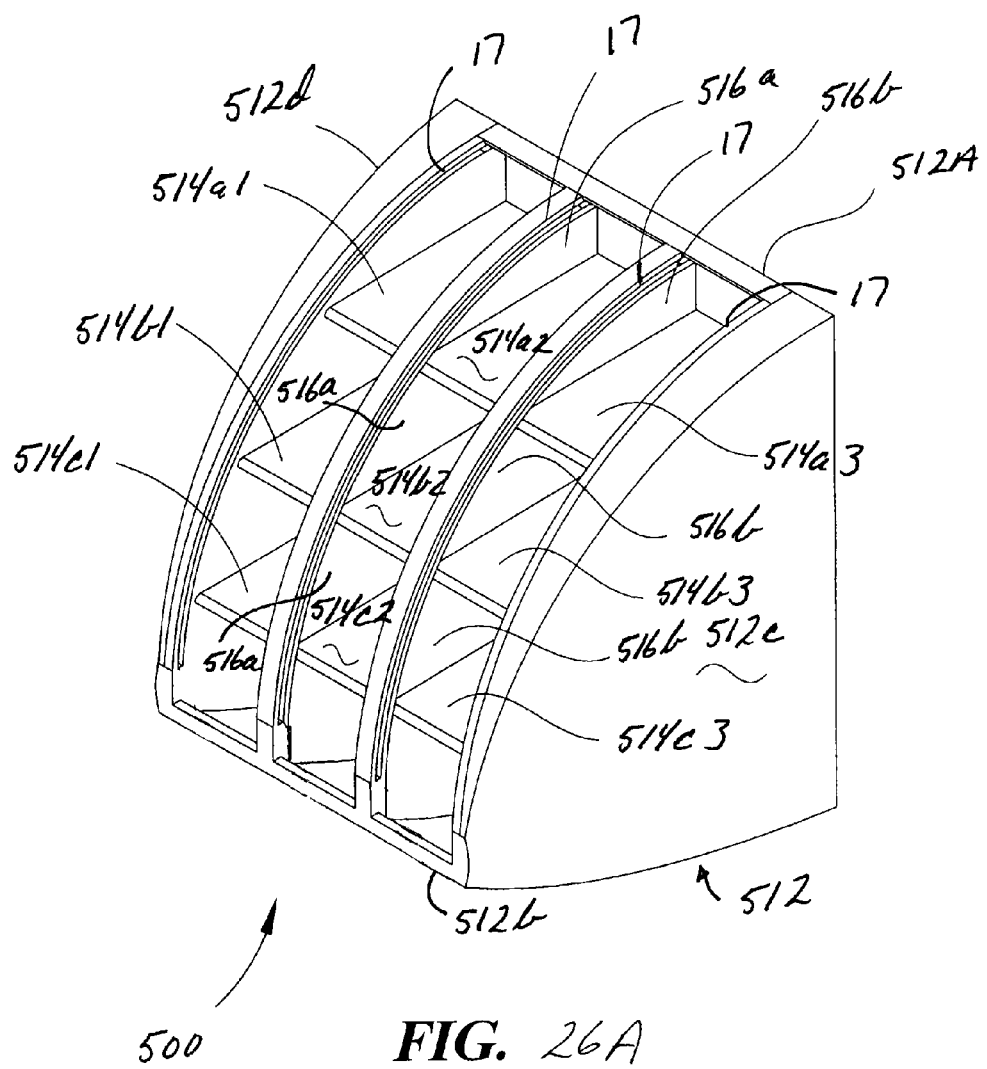
FIG. 26A is a perspective view of a 4-track cowling and FIG. 26B is a front view of the cowling.
Figure 26B:
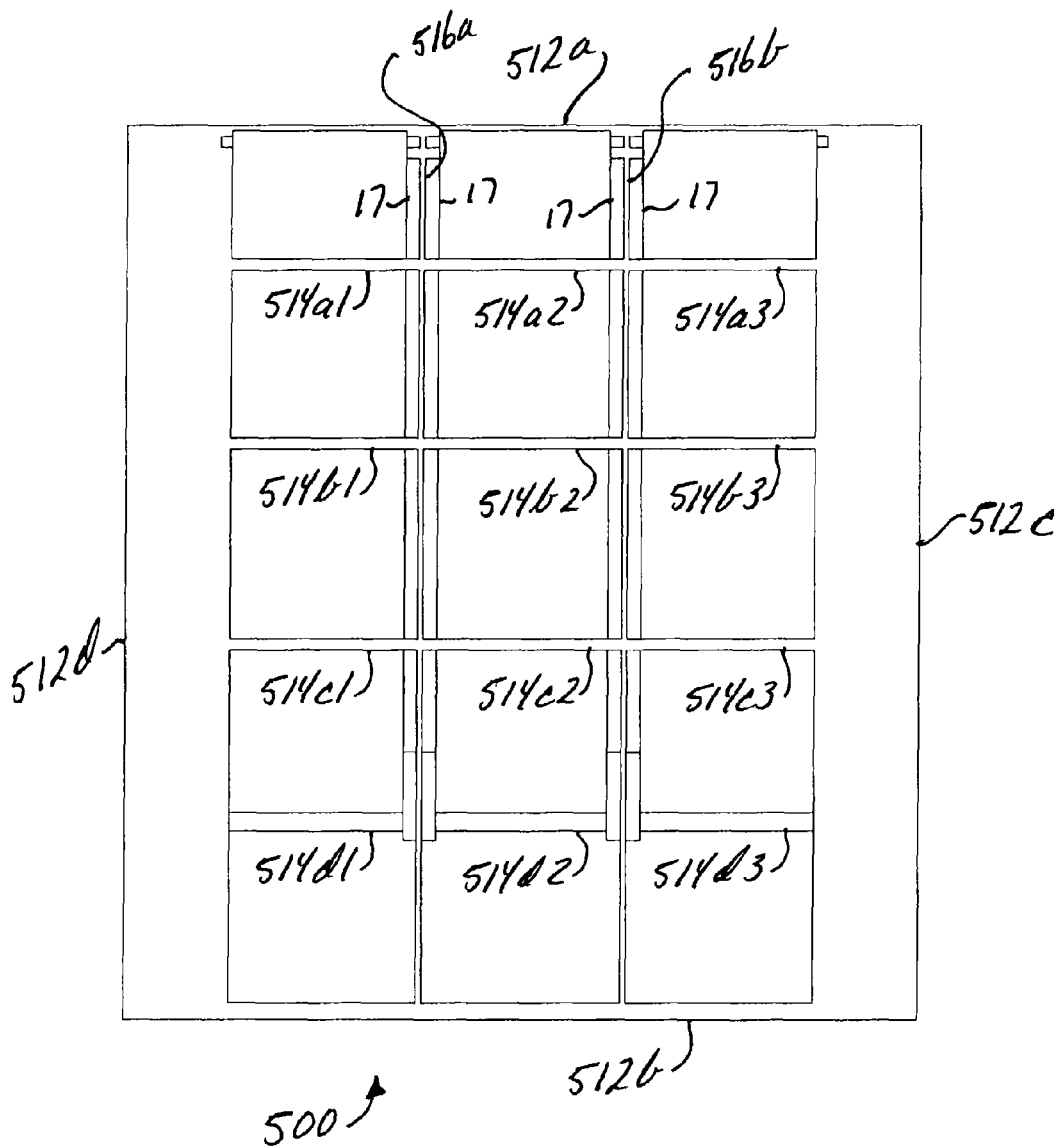
Figure 27A:
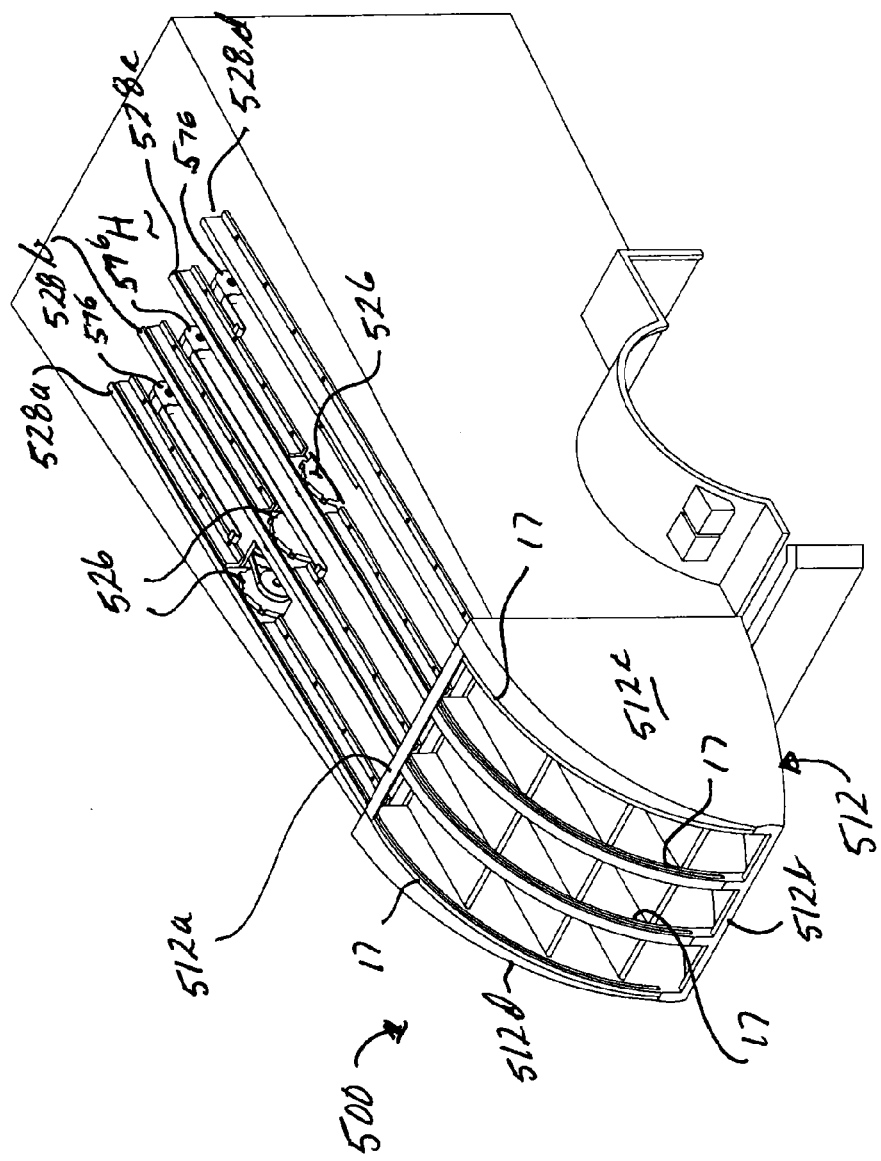
FIGS. 27A-27C are respective views of the assembly with the air passages open (FIG. 27A), partially dosed (FIG. 27B), and top plan view (FIG. 27C) of the assembly in its partially closed configuration.
Figure 27B:
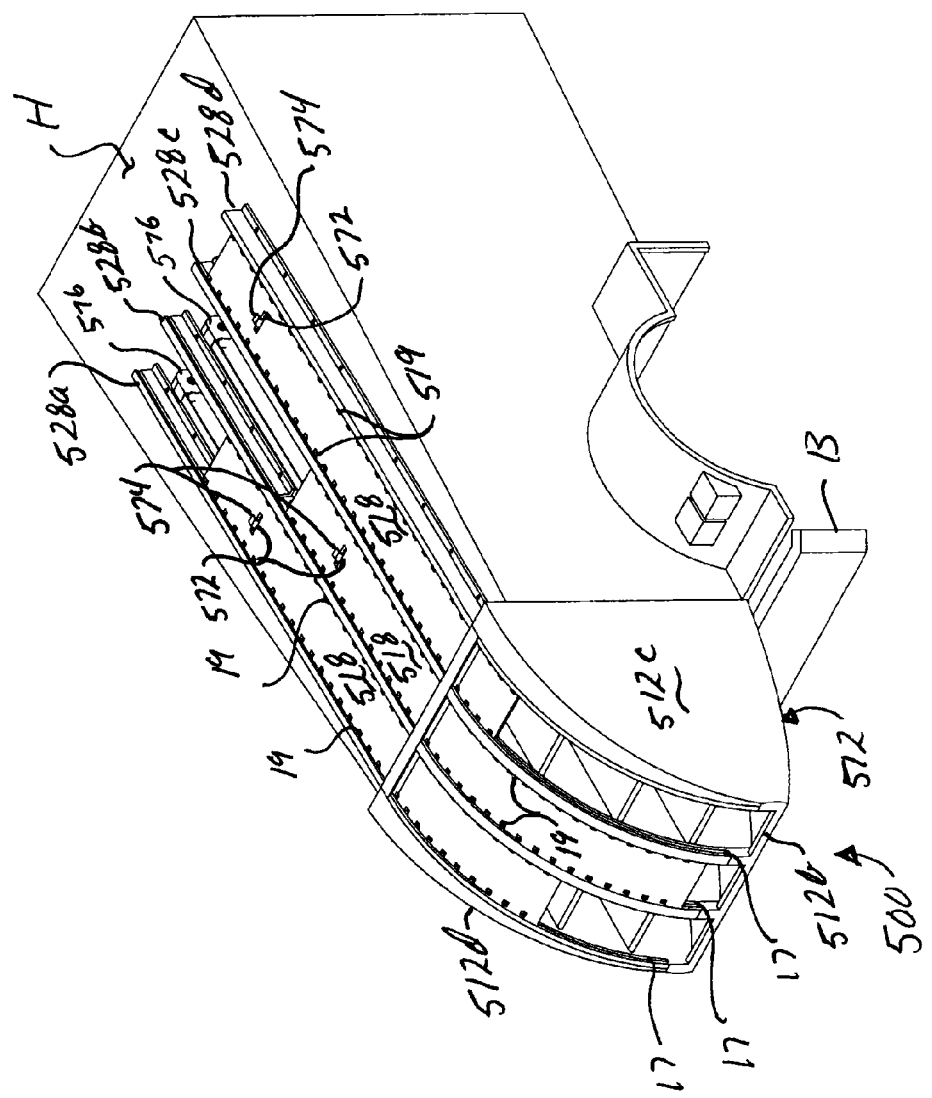
Figure 27C:
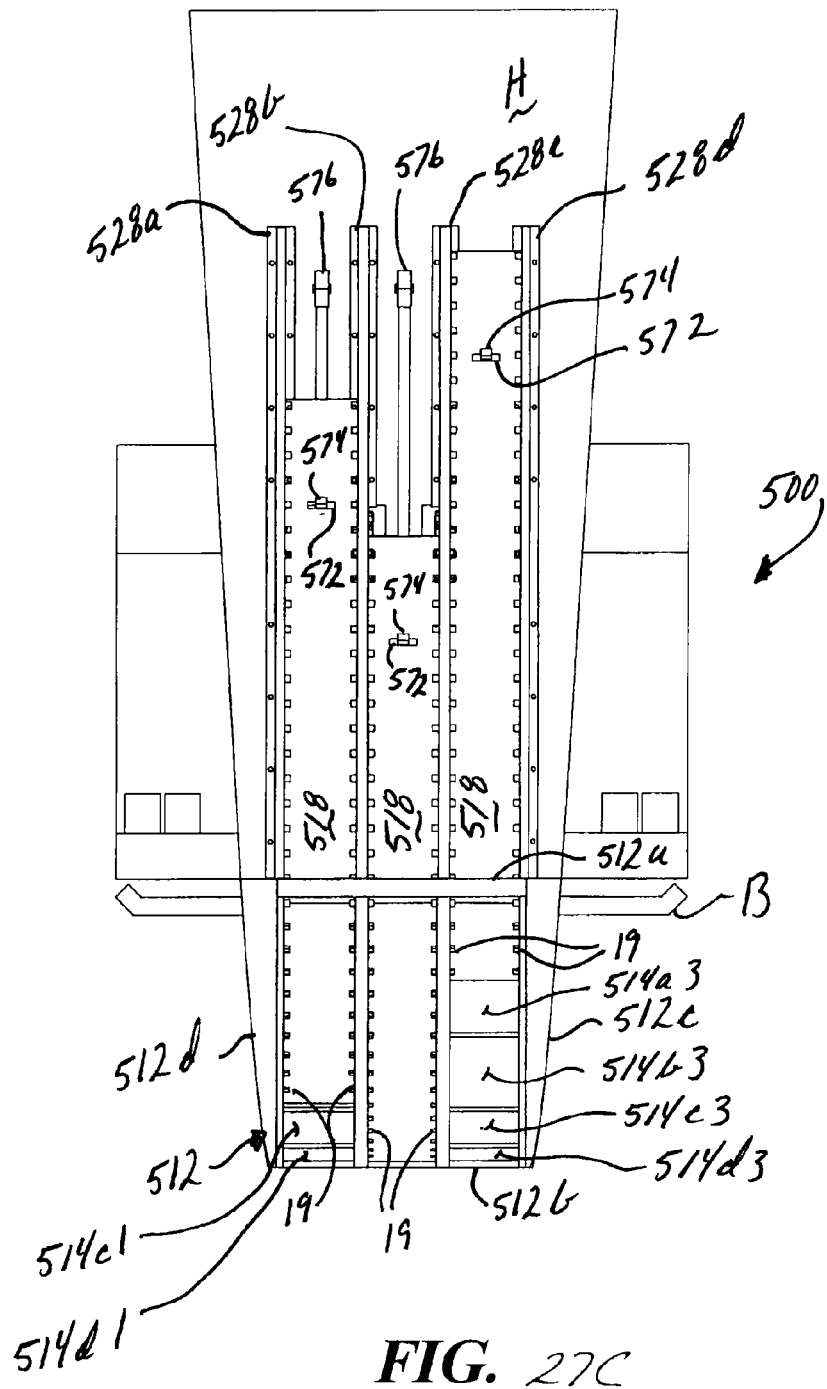

FIGS. 26A and 26B illustrate an embodiment 500 of the invention which is a variation of the embodiment shown in FIG. 25. Cowling assembly 500 includes a frame 512 having top, bottom, and side members 512a-512d. Assembly 500 includes interconnecting horizontal and vertical panels 514a1-514c3 and 516a, 516b respectively. These intersecting panels again form cells of different sizes and define air flow passages P for directing air to radiator R. Running along the inside of each sidewall or vertical panel is a track 17 for guiding movement of a cover panel 18 or coiled sheet. As shown in FIGS. 27A-27C, assembly 500 utilizes three sets of cover panels 518 which are respectively movable along paths defined by tracks 528a-528d constructed in the same manner as the previously described tracks 28a, 28b. Each cover panel 518 has sets of openings 19 formed along each longitudinal edge, these openings being engaged by teeth is a toothed gear 526 which is similar to the gear 26 previously described and driven in the same manner. Inwardly from each respective series of spaced holes 19 is an aperture 572 in which the hook end 574 of a constant tension spring assembly 576 is fitted. As earlier described with respect to tension spring assembly 36, tension spring assembly 576 provides a fail-safe in the event of failure of the drive mechanism by which the cover panels 518 are moved, so to return a cover panel to its fully withdrawn position.

As previously noted, the cowling assembly of the present invention can be used on passenger vehicles as well as trucks. FIGS. 24A-24E illustrate different configurations of a cowling assembly 400 for this purpose. The drawings each show a sectional view of the front end of a passenger car PC which includes a radiator R installed behind a front grill, of indicated generally FG, of the vehicle and which includes a manufacturer's emblem E. The front grill, besides extending generally across the front of the car, also extends from the hood HD of the vehicle, to the front bumper FB of the vehicle, and below the bumper to a lower cross member CM which extends across the front of the car beneath the radiator.

Figure 24A:
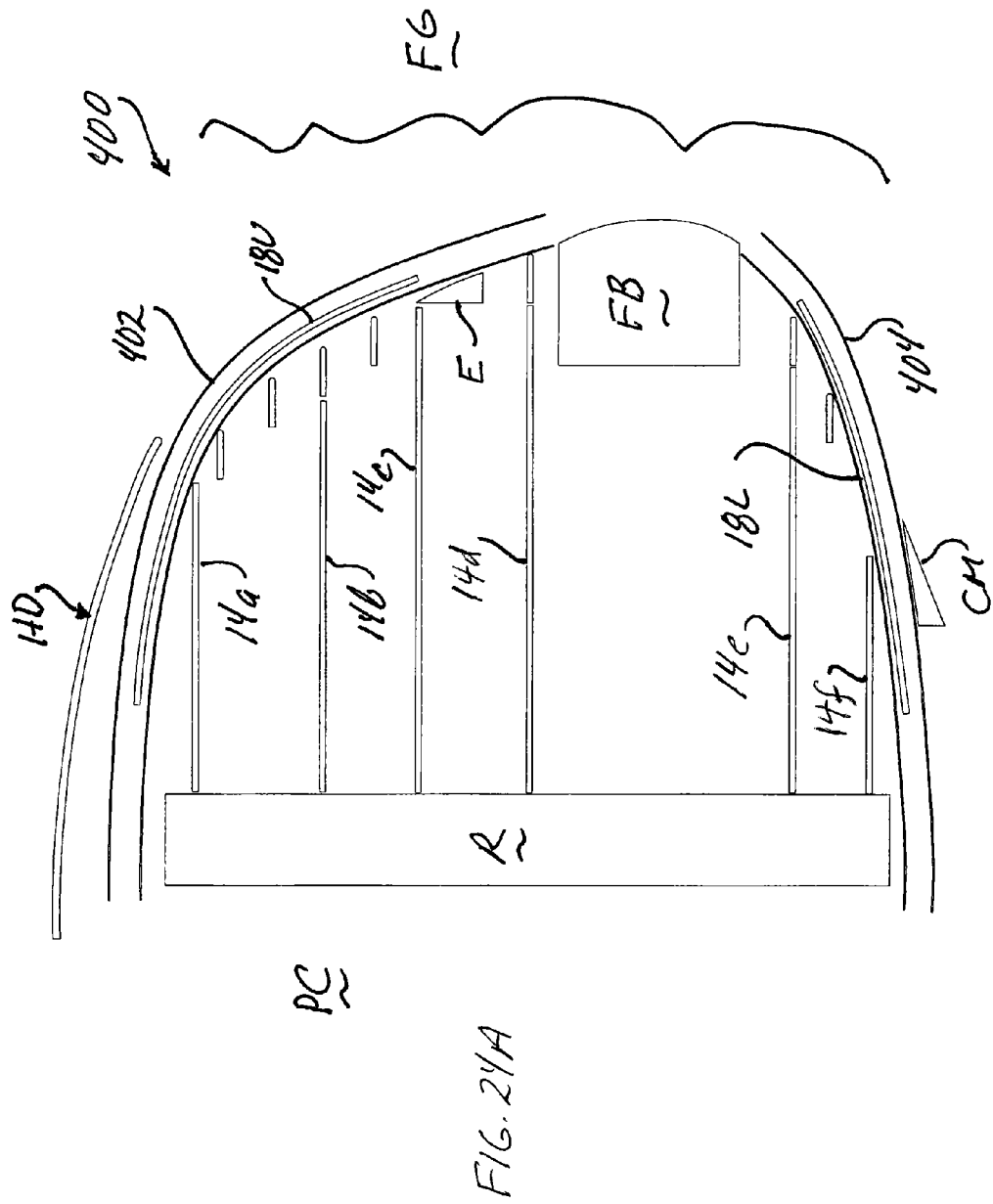

As shown in FIG. 24A, control of air flow to radiator R through grill FG is accomplished by moving a pair of cover panels 18U and 18L over the front grill. Panel 18U is an upper panel which is drawn down from the underside of hood HD over the front grill. Panel 18L is a lower panel which is drawn up over cross member CM toward front bumper FB along the lower extension of the grill. Upper and lower tracks 402 and 404 are respectively installed beneath the hood and over the cross member to guide movement of the panels. It will be understood by those skilled in the art that while the panels 18U and 18L extend over one side of the grill assembly FG, they could alternately be installed so to move over the other side of the assembly. Further, it will be appreciated that because of the construction of the grill assembly and components (e.g., headlight assemblies, etc.) installed adjacent or about the grill that the panels may be deformed or distorted as they move along their paths over the front of radiator R. This is also so as respect the other constructions described hereafter.

As described with respect to FIGS. 24D-24E, the panels for covering radiator R also include coiled sheets 118 wound on rollers 124. As with the panels, the coiled sheets are fitted beneath hood HD, and in an undercarriage panel adjacent cross member CM, as well as in the area of bumper FB.

Figure 24C:
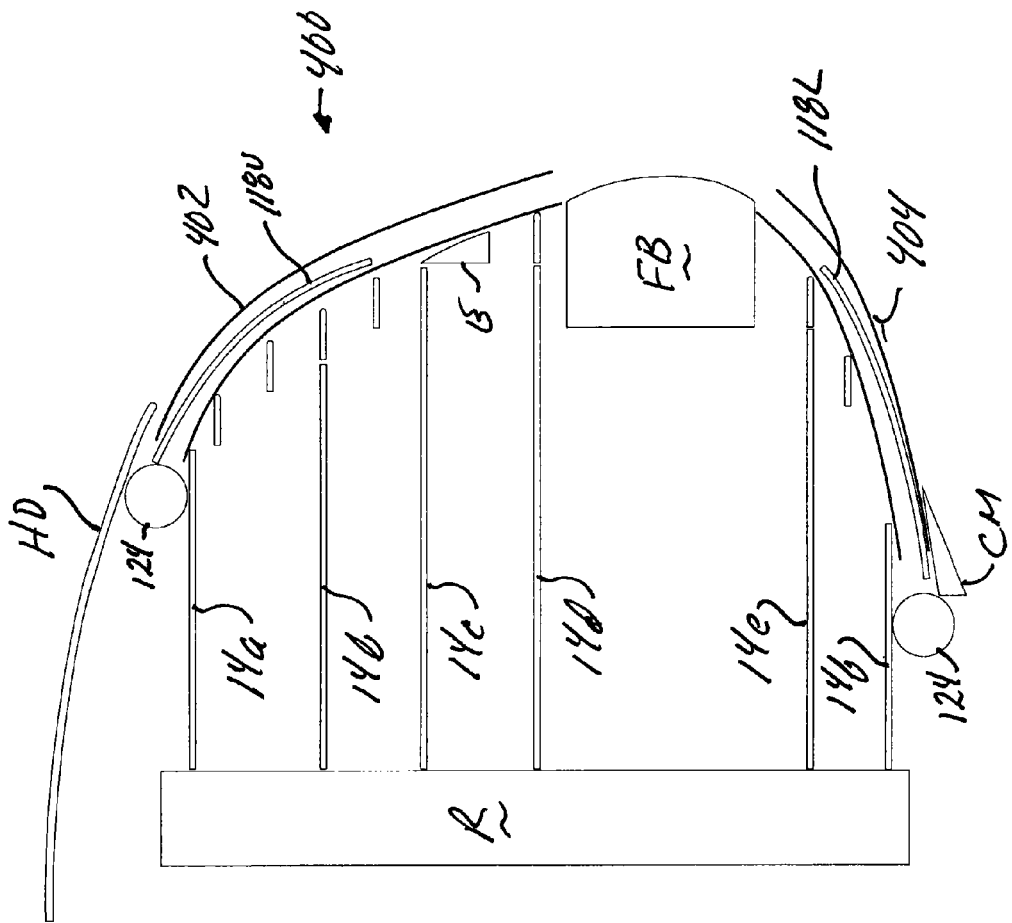
Figure 24B:
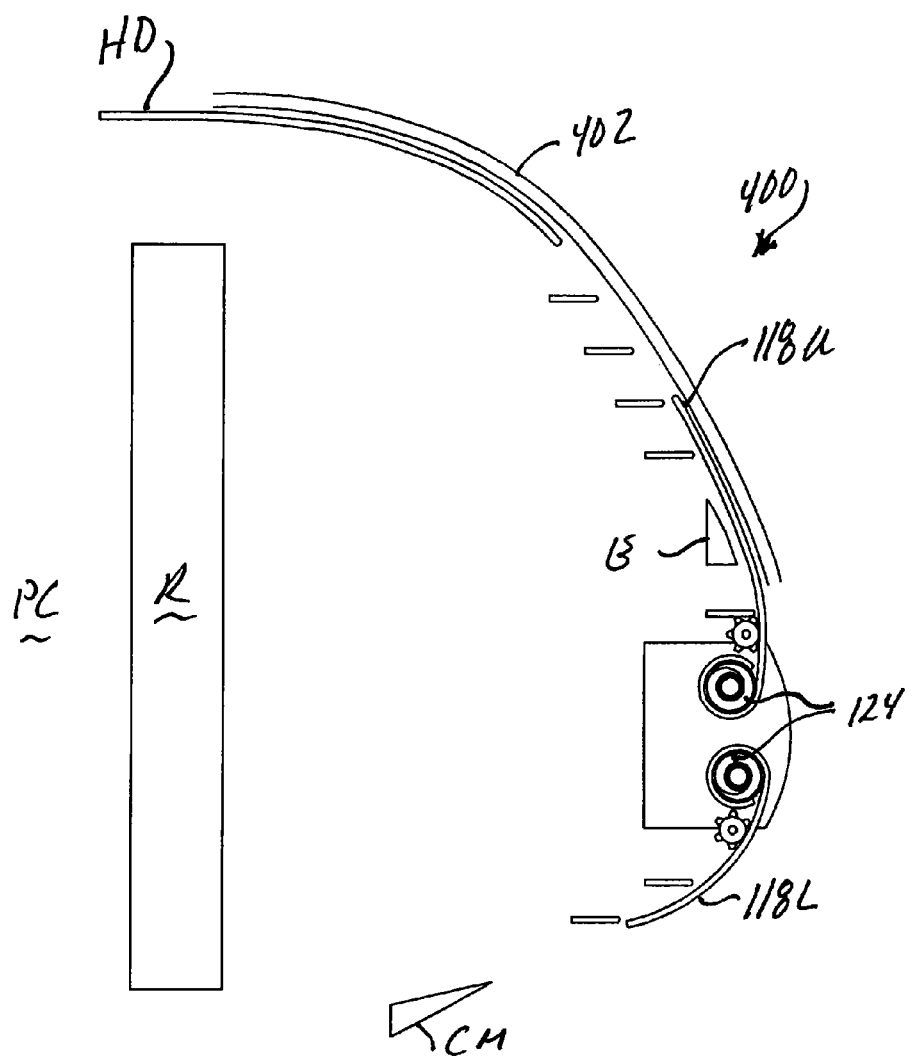

In the embodiment of cowling assembly 400 shown in FIG. 24B, a lower coiled sheet 118L is unwound from a motor driven spool roller 124 to move the sheet over the underside of the grill toward bumper FB. At the same time, a panel 18U is movable through track 402 to cover the upper portion of the grill.

In FIG. 24C, coiled sheet 418L is unwound from roller 124 which is installed beneath hood HD; while, lower coiled sheet 118L is unwound from its roller and moves as previously described.

In FIG. 24D, coiled sheet 118U is unwound as described in FIG. 23C; while, lower sheet 118L is unwound from a roller now placed behind front bumper FB and so moves in the opposite direction to that previously described.

Lastly, in the simplified representation of FIG. 24E both spools 124 for the respective sheets 118U and 118L are installed behind the front bumper.

What has been described is a cowling assembly which can be installed on a truck or passenger vehicle either as original equipment, or as a retrofit. The cowling, when installed, produces an aerodynamic airflow over, under, and about the sides of the vehicle to significantly reduce drag and improve fuel efficiency. Various embodiments of the assembly employ sheets, coils, or panels mounted in the frame or incorporated in the grill or hood of the vehicle. Regardless of the construction, the result is an aerodynamic configuration which reduces drag and promotes fuel economy.

The cowling is heated so to prevent freeze up during cold, sleet, ice and snow conditions.

Movement of the sheets, coils, or panels is controlled by a controller programmed for the vehicle on which the cowling is installed. The controller is either stand-alone or is incorporated into the ECM of the vehicle.

The cowling assembly is relatively lightweight, and is easy to install, remove, and service. The cowling is relatively low cost and has a long life. In use, the cowling restores a significant amount of horsepower otherwise wasted by vehicles as currently configured and helps realize substantial annual fuel savings particularly for fleet of trucks. Those skilled in the art will appreciate that a cowling installed on a passenger car will achieve similar advantageous results.

Figure 28A:
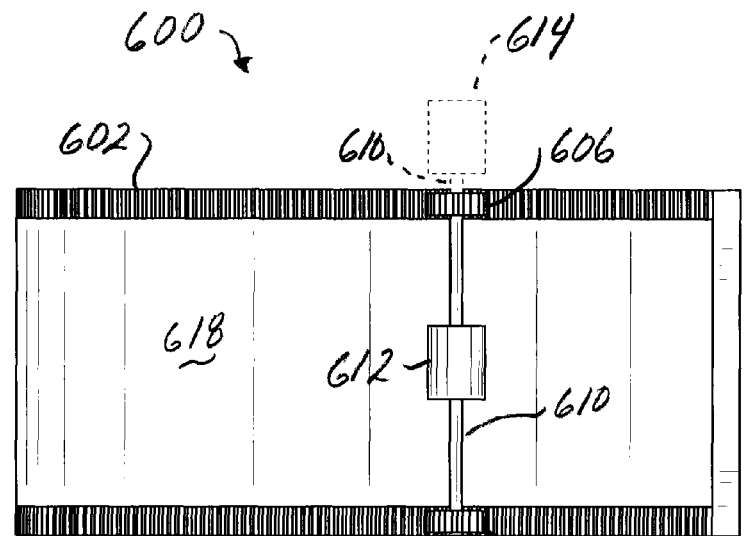
FIGS. 28A-28C are respective top, side, and front views of apparatus for moving a sheet forward, over, and back, away from, a radiator grille so to control air flow to the radiator.
Figure 28B:
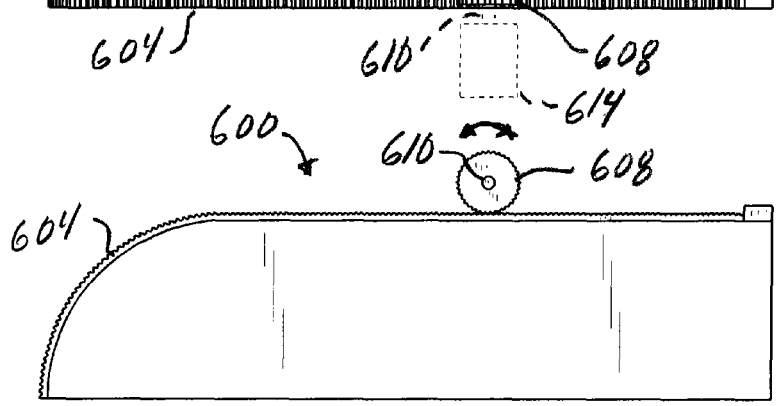
Figure 28C:
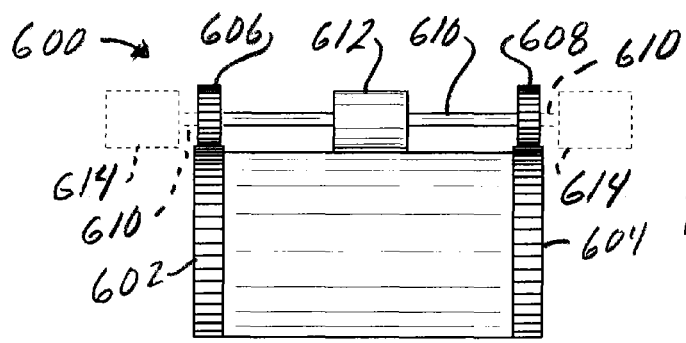

Referring now to FIGS. 28A-28C, a rack and pinion drive indicated generally 600 is for moving a sheet 618 forward, over, and back, away from, a radiator grille so to control air flow to radiator R. Sheet 618 is similar in construction to the sheets previously described. Racks 602, 604 extend the length of sheet 618 along each side of the sheet an adjacent its outer edges. The racks can either be integrally formed with the sheet; or they may be separate pieces which are attached to the sheet prior to its installation on a vehicle. Respective motor driven pinions 606, 608 are commonly mounted on a shaft 610. Shaft 610 is supported in the middle by a roller 612 through which the shaft extends. As shown in the drawings, roller 612 rests on the outer surface of sheet 618 which helps keep the sheet from flexing or bowing during movement of the sheet. The outer end of shaft 610 is connected to a reversibly drivable motor 614. As shown in the drawings, each end of shaft 610 may be connected to a reversibly drivable motor.

Further, it will be understood by those skilled in the art that a variety of positive engagement systems can be employed with rack and pinion drive 600. Also, a clutch mechanism (not shown) can be used. In addition, motor 614 can be a gear motor. Finally, wire bands or cables (not shown) can be employed to refine control of the drive.

Operation of the apparatus is such that when less air needs to flow into radiator R through the grille, the motor, or motors, 614 are commanded to move sheet 618 forward to partially cover the front of the radiator. At this time, the motors will rotate pinions 606, 608 clockwise as shown in FIG. 28B. Conversely, when more air needs to flow into the radiator, the motor, or motors, 614 are commanded to move sheet 618 rearwardly to uncover the front of the radiator. At this time, the motors will rotate pinions 606, 608 counterclockwise as shown in FIG. 28B.

Figure 29:
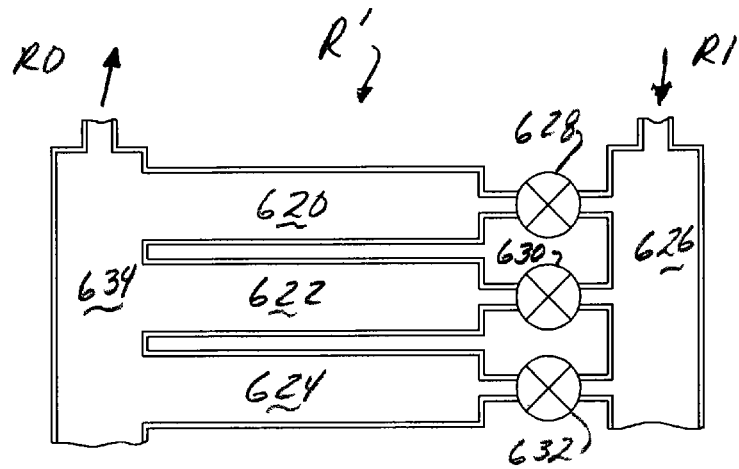
FIG. 29 is a diagram of a control system used with the apparatus for controlling fluid flow through a radiator.

Referring to FIG. 29, a radiator R' has a fluid inlet RI, a fluid outlet RO, and series of interconnected flow passages 620, 622, 624 intermediate the inlet and outlet. Those skilled in the art will understand that the radiator may have more or fewer passages. Fluid entering radiator flows through a passage 626 to the inlet of each passage 620-624. Respective control valves 628, 630, and 632 are interposed between passage 626 and each passage 620-624. The outlet end of each passage 620-620 flows into a common outlet passage 634.

The above radiator construction is used in connection with the movement of sheet 618 or the like over the front of the radiator. That is, if a portion of the radiator is covered so that no air flows through that portion of the radiator, then flowing radiator fluid through the passage 620-624 associated with that section of the radiator is not necessary. Accordingly, operation of flow control valves 628-632 is coordinated with the positioning of sheet 618. If the sheet covers the upper portion of radiator R', then valve 628 is shut off and radiator fluid flows only through passages 622, 624. If sheet 618 is drawn further over the front of the radiator, then control valve 622 may also be closed. Conversely, if sheet 618 is withdrawn from the front of the radiator, then control valve 620 is re-opened.

As previously described, a sheet such as sheet 618 can be drawn over the radiator from above; or, a sheet can be drawn up from the underside of the radiator to cover the lower portion of radiator R'. Accordingly, if both the upper and lower portions of the radiator are covered, then both control valves 620 and 624, for example may be closed with only valve 622 remaining open.

By providing a radiator with control valves, and coordinating operation of the sheet or sheets drawn over the front of the radiator with the opening and closing of the control valves, greater efficiency in the operation of the apparatus is achieved.

Figure 30A:
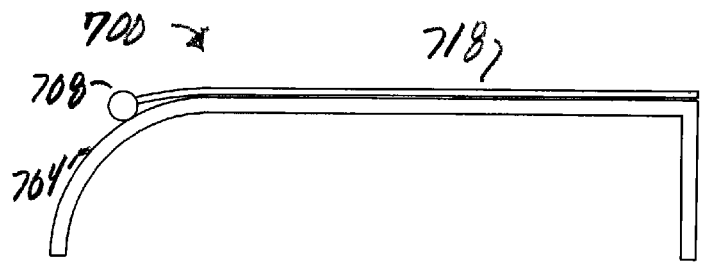
FIGS. 30A and 30B are respective side and perspective views of a guide structure for guiding movement of a sheet forward, over, and back, away from, a radiator grille.
Figure 30B:
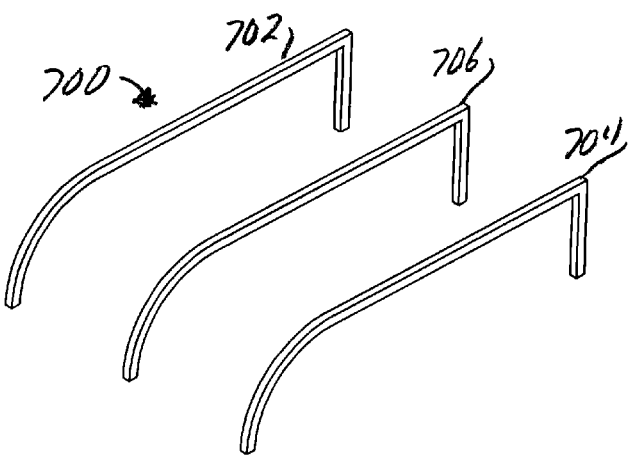

Referring to FIGS. 30A and 30B, another alternate embodiment of the apparatus of the invention is indicated generally 700. In this embodiment, a sheet 718 is moved forward or back, using any of the mechanisms previously described. Now, in addition to guide rails 702, 704 installed on opposite sides of the structure and over which sheet 718 is drawn, a center guide rail 706 is provided. Rail 706 generally supports the center section of the sheet so that it does not droop but rather remains aligned with the sides of the sheet. This prevents dragging of the sheet which negatively affects performance of the apparatus. In addition, a nose piece 708 formed, for example, of a rigid tube, is fitted to the front of sheet 718 and across the width of the sheet. In FIG. 31, an alternate nose piece 710 is shown as extending across the front of sheet 718. Nose piece 710 comprises, for example, a wiper 712 extending inwardly from tube 710. As shown in the drawing, as sheet 718 is drawn forward over the radiator, wiper 712 successively wipes across the outer margin of each panel 14a-14c to clear away any debris which may accumulate on the outer end of the panel. Those skilled in the art will appreciate that build-up of dirt and debris may affect the air over the panels and into the radiator.

Referring to FIG. 32, a controller 780 of the invention controls operation of the cowling and its panels using a microprocessor (μP) 782 which is a standalone processor operating independently from any other vehicle controllers. The controller controls operation of bi-directional motors such as the motors 614 which, as earlier noted, are supplied power from the vehicle's battery. A variety of inputs are supplied to microprocessor 782 from sensors installed on or about the vehicle. These include the outside air temperature, vehicle speed (combined with any wind speed), the inlet outlet temperatures of the fluid circulated through the radiator, and the flow rate of the fluid through the radiator in gallons per minute (GPM). Microprocessor 782 is programmed to use this information to again determine if the radiator should be covered; and if so, how much of it should be covered. If there should be coverage, then an output is supplied from the microprocessor to motors 614 to drive the motors in the appropriate direction to move sheet 618 and affect the desired amount of radiator coverage. Again, although not shown in the drawings, the ECM can also control valves or an electric water pump for controlling water flow in radiator R.

Figure 33A:
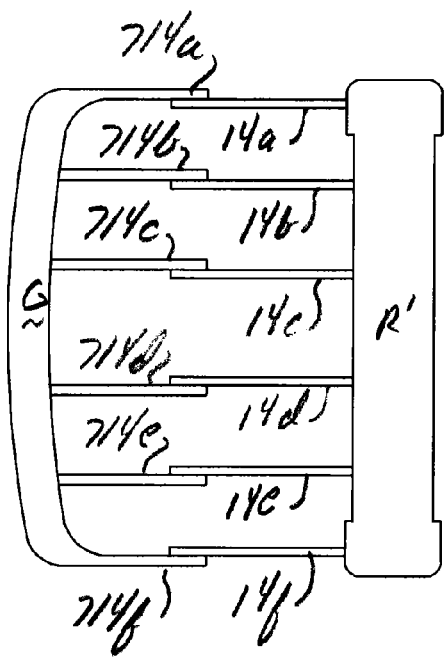
FIGS. 33A and 33B illustrate a collapsible ducting structure for guiding air flow into a radiator; and, FIGS. 34A and 34B are perspective views of the front end of a vehicle with apparatus of the present invention installed.
Figure 33B:
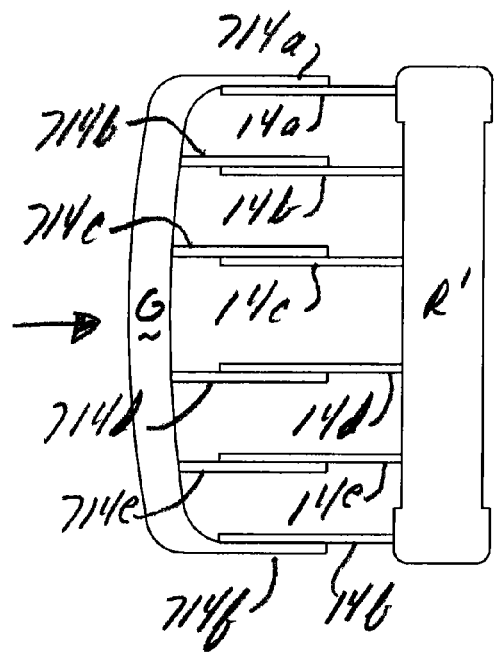

Next, referring to FIGS. 33A and 33B, radiator R' includes a set of spaced air flow panels 14a-14f. The grill G installed over the radiator includes a corresponding set of panels 714a-714f. To prevent damage to the respective sets of panels, they are offset, as shown in the drawings. Accordingly, if grill G is, for any reason, pushed toward radiator R', as indicated by the arrow in FIG. 33B, the panels 714a-714f will telescope over the panels 14a-14f and neither set of panels will be damaged.

Referring to FIGS. 34A and 34B, a cowling assembly is indicated generally 800. A frame 812 formed in the manner previously described is mounted over the front of vehicle V. The frame includes an upper section 812a which extends forwardly of the vehicle's hood H, a lower section 812b which extends forwardly from the bumper/air dam region on the underside of the front end of the vehicle, and curved side panels 812c and 812d which extend outwardly from the sides of the vehicle. Upper and lower sections 812a, 812b, and side panels 812c and 812d together define an opening or air inlet in the front of the vehicle through which air is directed to the vehicle's radiator (not shown).

As shown in FIG. 34B, respective axles or spindles 814a, 814b are mounted vertically within the area defined by sections 812c, 812d. A reversible stepper motor 816 is installed atop each axle for driving the axle in an appropriate direction to move panels or sheets 818a, 818b over the defined opening so to control the flow of air. Each panel is installed on a rotatable spool 820a, 820b. The spools are driven by their associated motors 816. Control of the motors is as previously described based on inputs to a microprocessor 780. When in operation, the sheets 818a, 818b move horizontally or from side-to-side over a curved path defined by the sections 812a, 812b, and panels 812c, 812d.

The invention claimed is:

1. A fairing air inlet assembly to reduce drag on a vehicle having a radiator with a front comprising:
   a) a frame having a front and a back, wherein the frame has an upper section and a lower section, and a pair of curved side panels forming an interior, wherein the upper section and the lower section have parallel curved front edges near the front of the frame;
   b) at least one air tunnel defined in the interior of the frame;
   c) a pair of sheets having parallel sides; wherein the sides are moveably engaged with the pair of curved front edges;
   d) a pair of vertical spools mounted on each curved side panel;
   the sides of the frame, the approximately horizontal and approximately vertical panel defining tunnels through which air flows to the radiator.

2. The fairing air inlet assembly of claim 1 further including a plurality of interior panels mounted in the frame at spaced intervals so to define a plurality of air tunnels to the radiator.

3. The fairing air inlet assembly of claim 1, wherein the sheets are moveable back and forth on curved tracks mounted near the front edges of the upper section and the lower section to control the amount of air flow through the tunnel to the radiator.

4. The fairing air inlet assembly of claim 3 in which the tracks are heated so to facilitate movement of the sheets over the tracks during freezing conditions.

5. The fairing air inlet assembly of claim 1 in which the sheets are a lightweight, flexible material.

6. The fairing air inlet assembly of claim 1 wherein the interior panel mounted in the frame is an approximately horizontal panel that extends approximately horizontally across the front of the radiator, and wherein the fairing air inlet assembly further includes at least one approximately vertical interior panel located intermediate
   wherein the sheets in the blocked position conform to the curved front edges of the upper section and the lower section; and
   wherein the curved shape of the front edges and the side panels reduces drag on the vehicle.

7. The fairing air inlet assembly of claim 6 further including sensors monitoring the radiator fluid temperature, wherein the sensors output data to a controller which in turn activate the drive mechanism.

8. The fairing air inlet assembly of claim 1 wherein the drive mechanism is a reversible step motor.

9. The fairing air inlet assembly of claim 8 in which the sheets comprise two sheets of material wound on the two spools; wherein the drive mechanism winds and unwinds the sheets from the spools; and wherein the sheets, when unwound, cover at least a portion of the front of the radiator.

10. A fairing air inlet assembly to reduce drag on a vehicle having a radiator with a front comprising:

a) a frame having a front and a back, wherein the frame has an upper section and a lower section, and a pair of curved side panels forming an interior, wherein the upper section and the lower section have parallel curved front edges near the front of the frame;
b) at least one air tunnel defined in the interior of the frame;
c) a pair of sheets having parallel sides; wherein the sides are moveably engaged with the pair of curved front edges;
d) a pair of vertical spools mounted on each curved side panel;
e) a drive mechanism to move the sheets from an unblocked position to a blocked position and back;
   wherein the back of the frame is mounted adjacent to the radiator;
   wherein the at least one air tunnel is in front of and approximately perpendicular to the radiator front and defines an opening through which air can flow into the radiator;
   wherein the sheets in the blocked position block airflow into the air tunnel toward the radiator and in the unblocked position allow airflow into the air tunnel and into the radiator;
e) a drive mechanism to move the sheets from an unblocked position to a blocked position and back;
   wherein the back of the frame is mounted adjacent to the radiator;
   wherein the at least one air tunnel is in front of and approximately perpendicular to the radiator front and defines an opening through which air can flow into the radiator;
   wherein the at least one air tunnel is further defined by at least one interior panel;
   wherein the at least one interior panel is generally rectangular and has sides, a front tip end, width and depth; and wherein the at least one interior panel is fixedly mounted on its sides in the interior of the frame;
   wherein the depth of the interior panel is sufficient to bring the at least one interior panel proximate to the front of the radiator;
   wherein the front tip end approximately aligns with the sheets in the blocked position;
   wherein the sheets in the blocked position block airflow into the air tunnel toward the radiator and in the unblocked position allow airflow into the air tunnel and into the radiator;
   wherein the sheets in the blocked position conform to the curved front edges of the upper section and the lower section; and
   wherein the curved shape of the front edges and the side panels reduces drag on the vehicle.

11. The fairing air inlet assembly of claim 10, wherein the at least one air tunnel is further defined by at least one interior panel.

12. The fairing air inlet assembly of claim 11, wherein the at least one interior panel is generally rectangular and has sides, a front tip end, width and depth; and wherein the at least one interior panel is fixedly mounted on its sides in the interior of the frame.

13. The fairing air inlet assembly of claim 12, wherein the depth of the interior panel is sufficient to bring the at least one interior panel proximate to the front of the radiator.

14. The fairing air inlet assembly of claim 10 further including sensors monitoring the radiator fluid temperature, wherein the sensors output data to a controller which in turn activate the drive mechanism.

15. The fairing air inlet assembly of claim 10 in which the tracks are heated so to facilitate movement of the sheets over the tracks during freezing conditions.

16. A fairing air inlet assembly to reduce drag on a vehicle having a radiator comprising:
a) a frame having a front and a back, wherein the frame has an upper section and a lower section, and a pair of curved side panels forming an interior, wherein the upper section and the lower section have a pair of curved tracks on the interior near the front of the frame;
b) a plurality of air tunnels in the interior of the frame;
c) a pair of sheets having parallel sides; wherein the sides are moveably engaged with the two curved tracks;
d) a drive mechanism to move the sheets from an unblocked position to a blocked position and back;
e) the pair of sheets comprise two sheets of material wound on two spools; wherein the drive mechanism winds and unwinds the sheets from the spools; and wherein the sheets, when unwound, cover at least a portion of the front of the radiator,
   wherein the back of the frame is mounted in front of, adjacent to and about the radiator;
   wherein the air tunnels are approximately perpendicular to the radiator front and define openings through which air can flow into the radiator;
   wherein the air tunnels are further defined by a plurality of approximately horizontal and approximately vertical interior panels;
   wherein the interior panels are generally rectangular and have sides, an outer tip end, width and depth; and wherein the panels are fixedly mounted on their sides in the interior of the frame;
   wherein the depth of the panels is sufficient to bring the mounted panel proximate to the front of the radiator;
   wherein the sheets in the blocked position block airflow into the air tunnel toward the radiator and in the unblocked position allow airflow into the radiator;
   wherein the sheets in the blocked position conforms to the curved shape of the track; and wherein the curved shape reduces drag on the vehicle;
   wherein the sheets move between the blocked and unblocked position, and multiple intermediate positions between the blocked and unblocked positions; and
   wherein the fairing further includes sensors monitoring the ambient temperature, and air conditions, wherein the sensors output data to a controller which in turn activate the drive mechanism.

* * * * *

UNITED STATES PATENT AND TRADEMARK OFFICE
CERTIFICATE OF CORRECTION

PATENT NO. : 8,997,907 B2  
APPLICATION NO. : 13/837105  
DATED : April 7, 2015  
INVENTOR(S) : Mark Rode et al.

Page 1 of 1

It is certified that error appears in the above-identified patent and that said Letters Patent is hereby corrected as shown below:

On the title page item (72), Inventors: should read, Mark Rode, Kirkwood, MO (US), Trung Q. Do, Bridgeton, MO (US)

Signed and Sealed this
Fifteenth Day of September, 2015

Michelle K. Lee
*Director of the United States Patent and Trademark Office*